(12) United States Patent
Atherton et al.

(10) Patent No.: US 7,049,962 B2
(45) Date of Patent: May 23, 2006

(54) MATERIALS AND CONSTRUCTION FOR A TAMPER INDICATING RADIO FREQUENCY IDENTIFICATION LABEL

(75) Inventors: Peter S. Atherton, Vienna, VA (US); David M. Price, Mendon, MA (US); James Whitefield, Charlestown, RI (US); Miao Yong Cao, Warwick, RI (US)

(73) Assignees: Micoh Corporation, McLean, VA (US); Parlex Corporation, Methuen, MA (US)

( * ) Notice: Subject to any disclaimer, the term of this patent is extended or adjusted under 35 U.S.C. 154(b) by 745 days.

(21) Appl. No.: 09/915,760

(22) Filed: Jul. 26, 2001

(65) Prior Publication Data

US 2002/0036237 A1    Mar. 28, 2002

Related U.S. Application Data

(60) Provisional application No. 60/236,218, filed on Sep. 28, 2000, provisional application No. 60/221,640, filed on Jul. 28, 2000.

(51) Int. Cl.
*G08B 13/14* (2006.01)

(52) U.S. Cl. .............................. 340/572.1; 340/572.8; 340/572.9

(58) Field of Classification Search ............. 340/572.1, 340/573.1, 572.8, 572.9, 572.7, 551

See application file for complete search history.

(56) References Cited

U.S. PATENT DOCUMENTS

| | | | |
|---|---|---|---|
| 3,671,721 A * | 6/1972 | Hunn et al. | 235/439 |
| 4,029,945 A * | 6/1977 | Yamada et al. | 235/488 |
| 4,740,536 A | 4/1988 | Chao | 523/406 |
| 4,752,680 A * | 6/1988 | Larsson | 235/492 |
| 5,358,982 A | 10/1994 | Geisler et al. | 523/414 |
| 5,442,334 A | 8/1995 | Gallo et al. | 340/572 |
| 5,567,760 A | 10/1996 | Walther et al. | 524/505 |
| 5,604,485 A * | 2/1997 | Lauro et al. | 340/572.5 |
| 5,644,295 A * | 7/1997 | Connolly et al. | 340/568.1 |
| 5,767,772 A | 6/1998 | Lemaire et al. | 340/571 |
| 5,777,003 A | 7/1998 | Haas et al. | 523/223 |
| 5,834,538 A | 11/1998 | DeHullu et al. | 524/22 |
| 6,050,622 A * | 4/2000 | Gustafson | 292/307 R |
| 6,110,551 A | 8/2000 | Exline et al. | 428/40.1 |
| 6,147,604 A | 11/2000 | Wiklof et al. | 340/572.1 |
| 6,242,512 B1 | 6/2001 | Figge et al. | 523/340 |
| 6,255,958 B1 | 7/2001 | Haimovich et al. | 340/686.6 |

* cited by examiner

*Primary Examiner*—John Tweel
(74) *Attorney, Agent, or Firm*—Weingarten, Schurgin, Gagnebin & Lebovici LLP

(57) ABSTRACT

Materials and construction for a tamper indicating radio frequency identification (RFID) label are provided to permit the destruction of the label or its properties in the event of attempts to remove the label from a surface to which it has been applied. An adhesion modifying coating is applied to a label surface or portions thereof to affect the relative adhesion strengths between different layers or areas of the label. The adhesion modifying coating can be applied in selected patterns to achieve differential adhesion strengths and resulting differential separation of the label from a surface on which it has been applied.

48 Claims, 16 Drawing Sheets

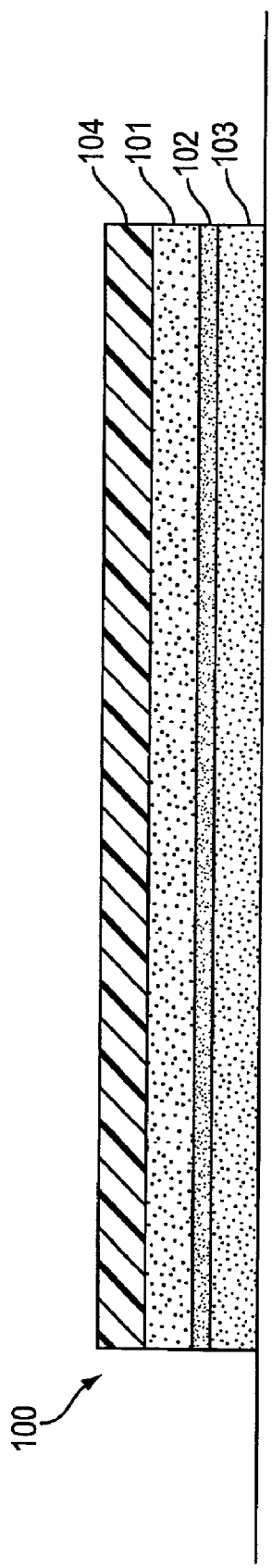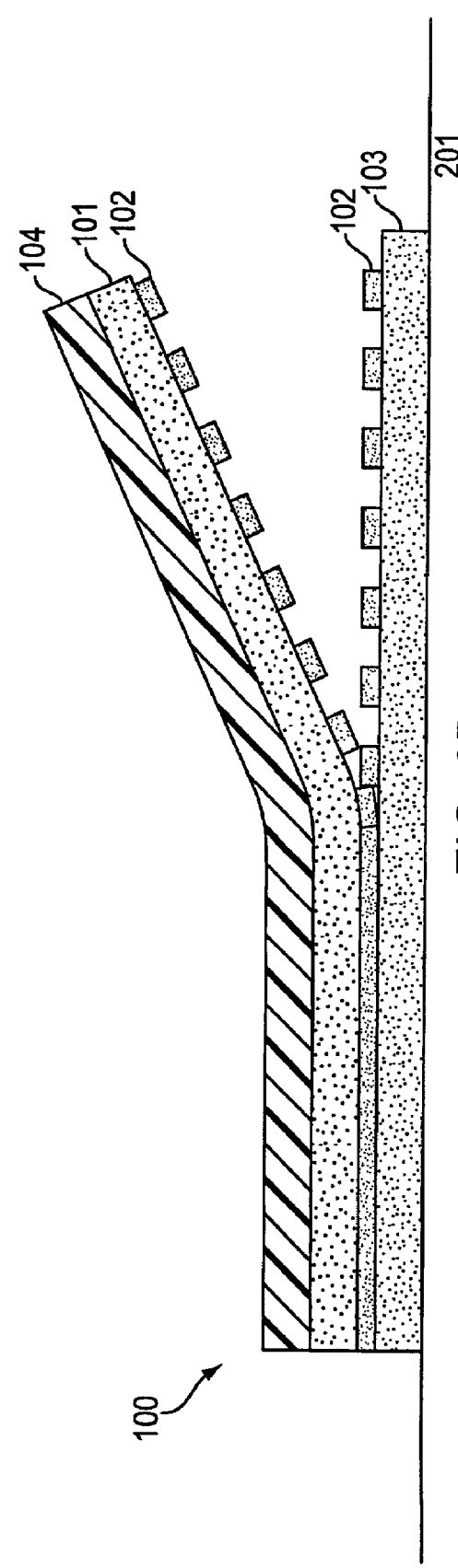

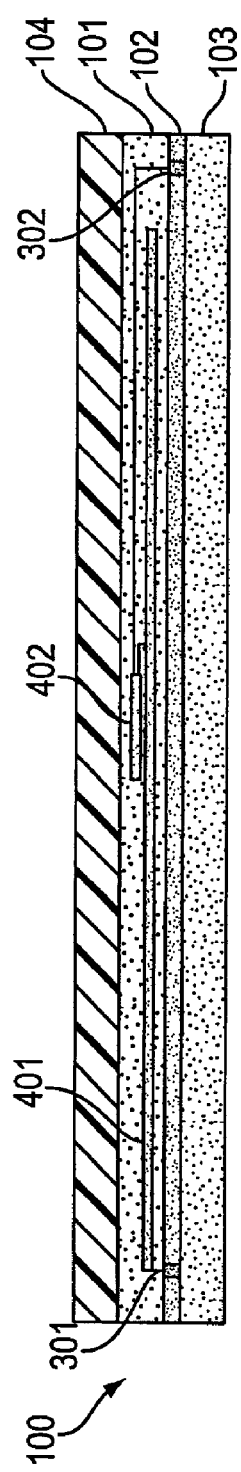
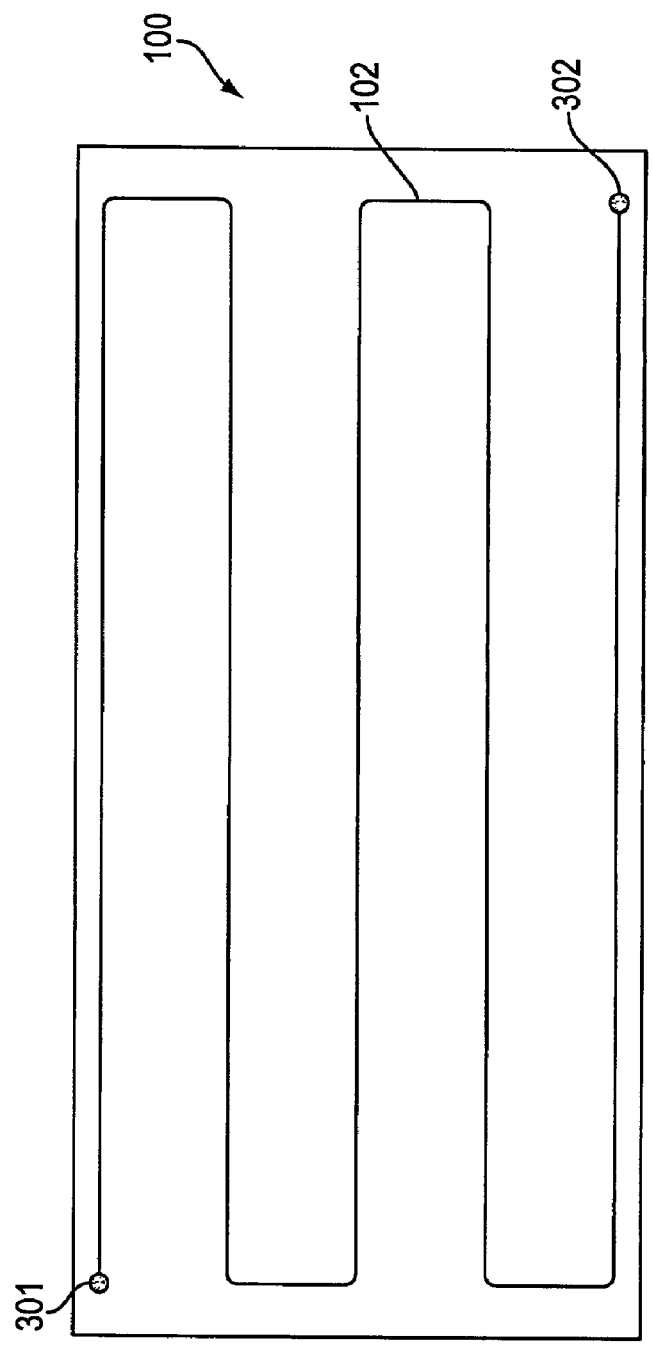
FIG. 4A
FIG. 4B

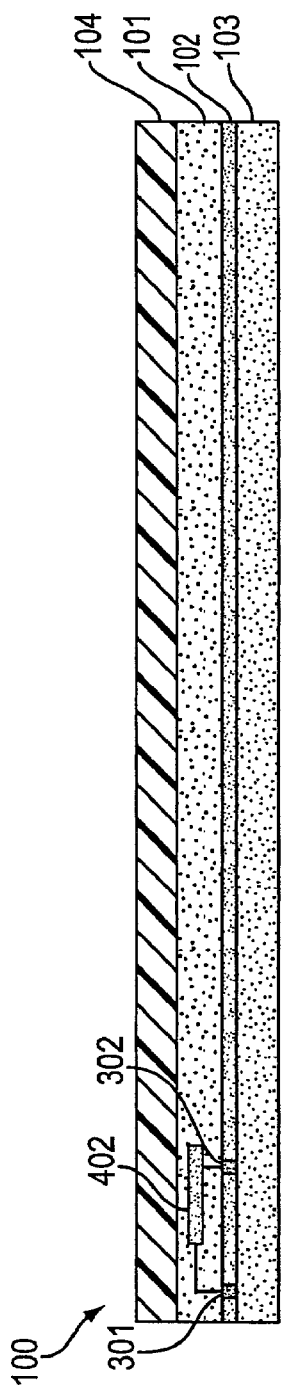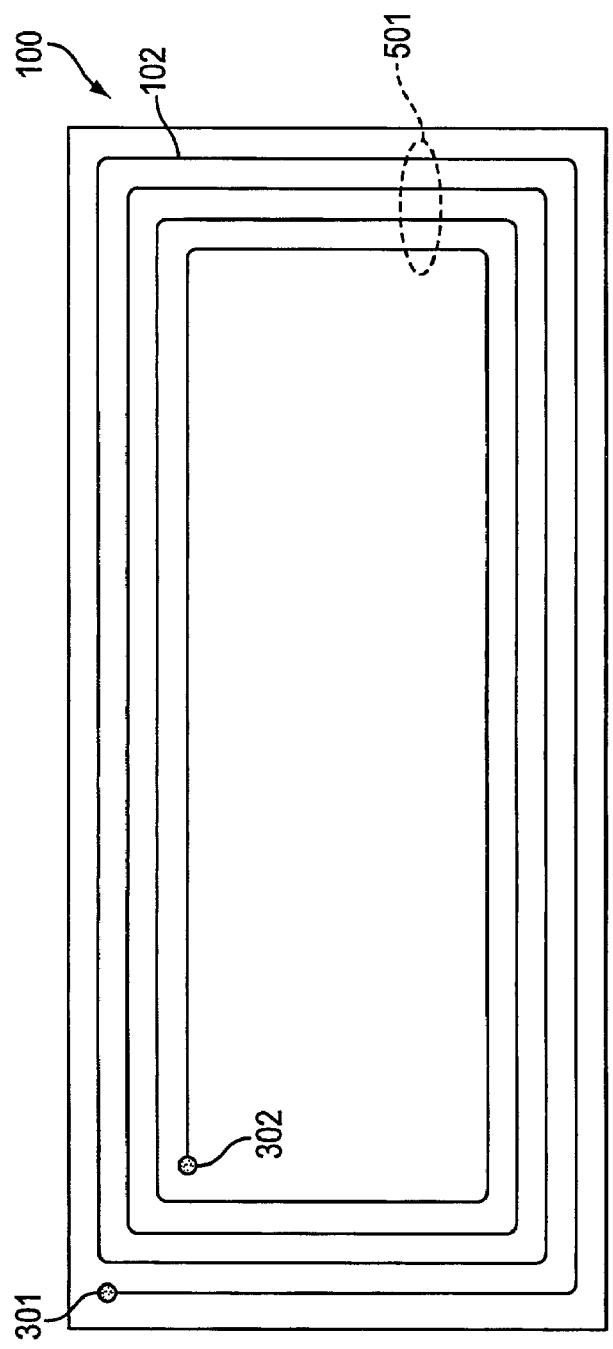
FIG. 5A
FIG. 5B

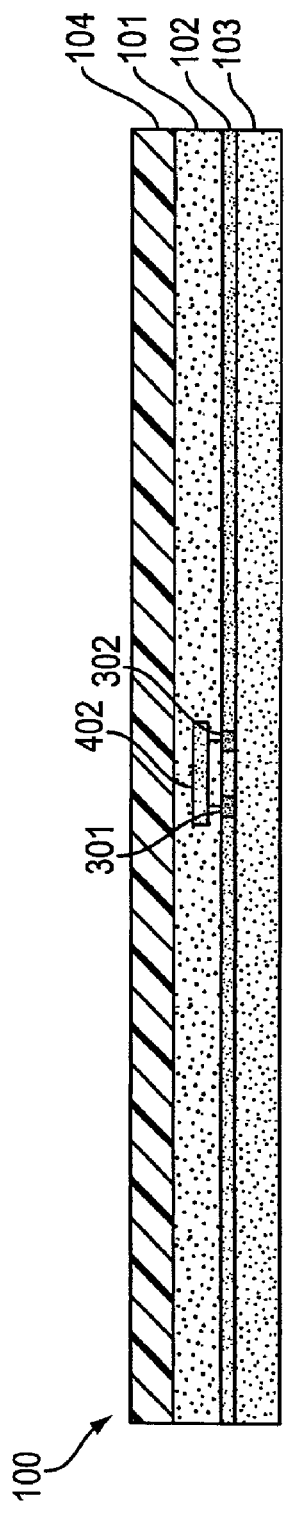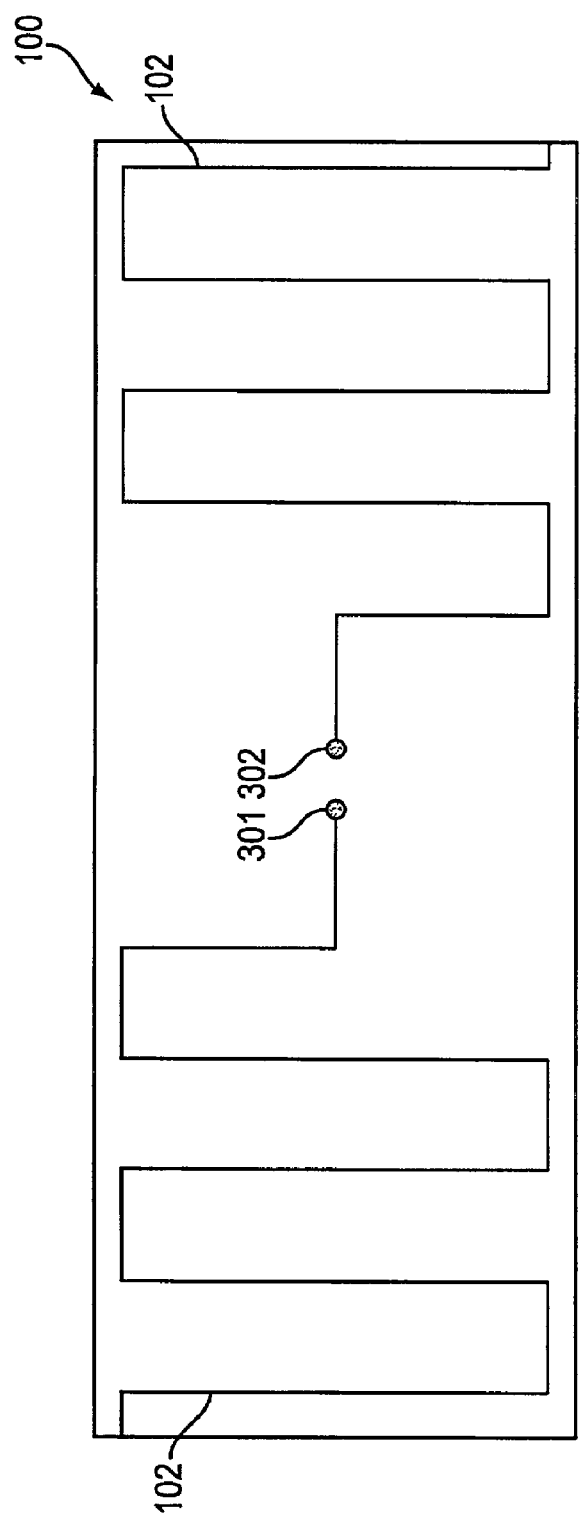
FIG. 6A
FIG. 6B

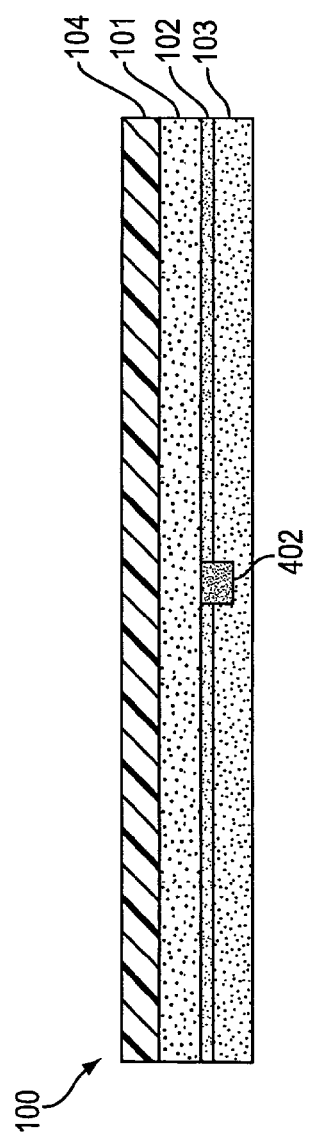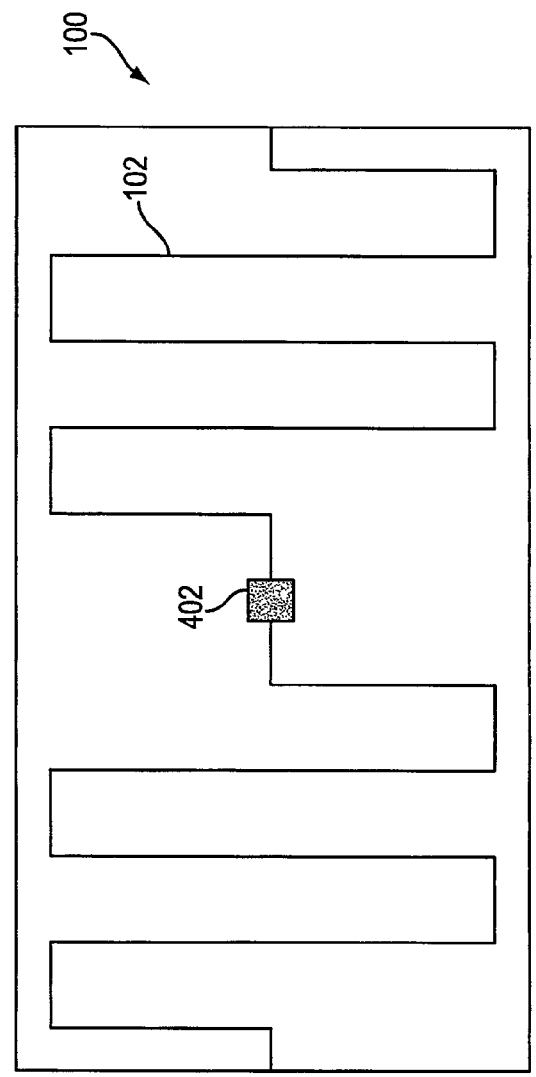

MATERIALS AND CONSTRUCTION FOR A TAMPER INDICATING RADIO FREQUENCY IDENTIFICATION LABEL

CROSS REFERENCE TO RELATED APPLICATIONS

This application claims priority under 35 U.S.C. §119(e) to provisional application Ser. No. 60/221,640 filed Jul. 28, 2000 and application Ser. No. 60/236,218 filed Sep. 28, 2000.

STATEMENT REGARDING FEDERALLY SPONSORED RESEARCH OR DEVELOPMENT

N/A

BACKGROUND OF THE INVENTION

Radio Frequency Identification (RFID) is being used increasingly as a means to identify goods at a distance, without requiring physical contact or even line of sight access to the goods. RFID enables information about an item to be stored on an item and in some implementations also allows this stored information to be modified at a distance. The most compact and cost effective means to provide this RFID capability is by means of a pressure sensitive (i.e. self-adhesive) label incorporating an RFID capability.

The ability to detect remotely whether a pressure sensitive label or seal applied to an item has been tampered with or removed is becoming increasingly important in order to detect theft, product substitution, tampering, warranty violation and other problems.

A disadvantage of current pressure sensitive label technology is that it does not allow the remote determination of whether or not a label has been tampered with or removed and relocated.

BRIEF SUMMARY OF THE INVENTION

A tamper indicating label is provided. The label may comprise RFID components and a tamper track connected to the RFID components. The tamper track is preferably formed by destructible electronics. The tamper track may be modified when the label is tampered with. In one embodiment, the RFID components are able to detect the modification in the tamper track while maintaining their RFID capability. Detection of the modification in the tamper track indicates tampering of the label. In an alternative embodiment, the modification in the tamper track disables the RFID function.

In a further embodiment, the label comprises an RFID layer. The RFID layer may include a memory chip and at least one of an antenna or loop inductor. Means for attaching the RFID layer to an object may also be provided. The means for attaching may be an adhesive layer. The adhesive layer can support the RFID layer. A destructible conducting path may be sandwiched between the RFID layer and the adhesive layer. The destructible conducting path should be disrupted when the label is tampered. The disruption preferably modifies in some way the RFID characteristics of the RFID layer.

In a further embodiment, at least a part of the destructible conducting path may be in contact with the adhesive layer. The destructible conducting path can thereby be modified when the label is at least partially removed from a surface, and in turn, modify the RFID characteristics of the label, indicating tampering.

According to another embodiment, the invention includes an RFID system. A substrate having a top and a bottom surface is provided. RFID electronic components are applied to the bottom surface of the substrate. A conductive layer may also be formed in a pattern on the bottom surface of the substrate. An adhesive layer may support the substrate such that the RFID electronic components and the conductive layer are sandwiched between the substrate and the adhesive layer. The adhesive layer, the substrate, and conductive layer should have relative adhesion strengths such that when the system is partially removed from a surface to which it has been applied, at least one of the RFID components and the conductive layer is altered to modify the RFID characteristics of the system.

The relative adhesion between layers of the transponder is determined by an adhesion modifying coating which affects the relative adhesion strengths between the different layers or areas of the label. The adhesion modifying coating is applied to the label or portions thereof, in selected patterns which provide the relative adhesion strengths and selected separation of the label or portions thereof during attempts to remove the label from a surface to which it is applied.

BRIEF DESCRIPTION OF THE SEVERAL VIEWS OF THE DRAWING

The present invention will now be described by way of non-limiting example with reference to the accompanying drawings, wherein:

FIG. 2A–2B are schematic illustrations of a preferred embodiment and characteristics of the tamper indicating layer within a tamper indicating REID label;

FIGS. 4A–4B are schematic illustrations of a preferred embodiment of a tamper indicating RFID label in which the tamper indicating conducting track is in series with an induction loop in said label;

FIGS 5A–5B are schematic illustrations of a preferred embodiment of a tamper indicating RFTD label in which the tamper indicating conducting track forms the induction loop of said label;

FIGS. 6A–6B are schematic illustrations of a preferred embodiment of a tamper indicating RFID label in which the tamper indicating conducting tracks form the antenna of said label;

FIGS. 7A–7B are schematic illustrations of a variation of the RFID label of FIG. 6;

DETAILED DESCRIPTION OF THE INVENTION

The term "passive", as used herein, refers to an RFID label or transponder which does not include an on-board power source such as a battery. The term "active", as used herein, refers to an RFID label or transponder which includes an on-board power source such as a battery. An advantage of an active RFID label, relative to a passive RFID label, is that an active RFID label can include continuous on-board functions such as a clock, and can usually enable longer read and write distances. A disadvantage of active RFID labels, relative to passive RFID labels, is that active RFID labels are physically larger due to the need to carry an on-board power source.

It should be appreciated that the terms label and tag may be used interchangeably in this document. Where the term label is used, the term tag may validly be substituted. The essential difference between the two is the thickness and types of material used in the construction. In general a label will be made from thin, flexible materials, while a tag will be made from thicker, stiffer materials. A tag may, for example, be similar to a plastic card with a pressure sensitive adhesive on the underside. Such tags may be used, for example, as compliance plates or rating plates or specification plates on various types of equipment. A tag, because of its greater thickness, is better suited to active RFID technology.

It should be appreciated that the illustrations herein are not to scale. In general the thickness of the label constructions (and component layers thereof) illustrated in the figures have been exaggerated, to illustrate more clearly the internal structures and components.

In general, a tamper indicating label is provided. The label may include RFID components and a tamper track coupled to the RFID components. The tamper track should be constructed from a destructible electrically conducting path. Additionally, the tamper track can be formed such that it is damaged when the label is tampered. In one embodiment, adhesion characteristics of the tamper track are adapted to break apart the tamper track when the label is tampered, for example, by removal from an object. The RFID components may retain their RFID capability and detect when the tamper track has been damaged to indicate that the label has been tampered. Alternatively, the RFID capability of the RFID components may be disabled when the tamper track is damaged, indicating tampering.

Figure 1:
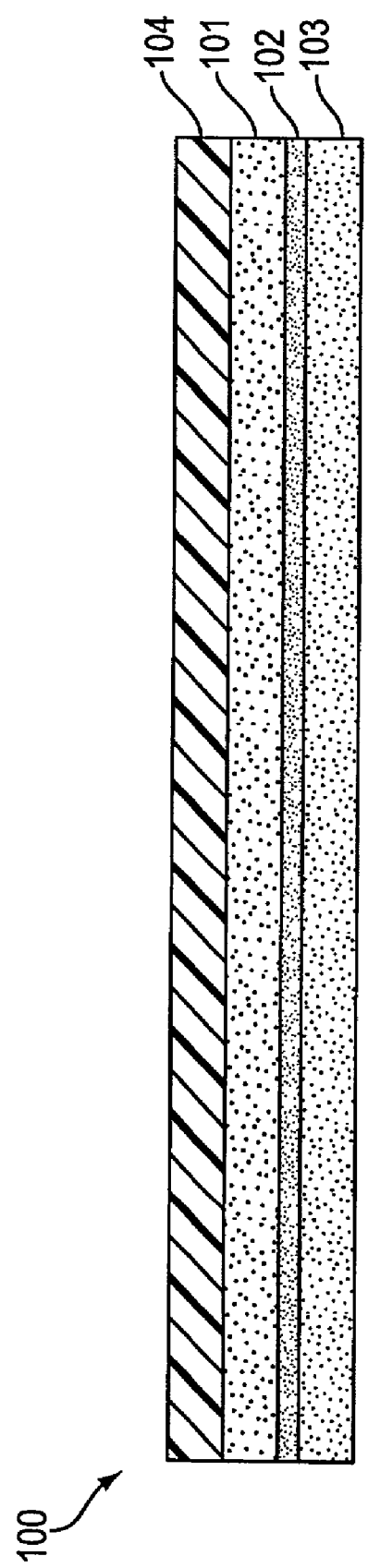
FIG. 1 is a schematic illustration of the general design of a tamper indicating RFID label, which is the subject of the present invention.

FIG. 1 is a schematic illustration of the general design of a tamper indicating RFID label according to an embodiment of the invention. FIG. 1 shows schematically a pressure sensitive (i.e. self-adhesive) label 100 in cross sectional view. The label 100 may include four functionally distinct layers.

The RFID layer 101 may be a layer, which includes RFID components, for example, an RFID memory chip. The label 100 may in some embodiments provide an "active" RFID capability, in which case the layer 101 can also include a battery or other power source.

The second layer 102 may include one or more thin electrically conducting tracks which should be coupled to the RFID components in the layer 101. The tracks are known herein as "tamper tracks" since they provide a means to detect tampering with or removal of the label 100 from a surface to which it has been applied.

The layer 101 and the layer 102 may together provide an RFID capability. On the other hand, in some embodiments the layer 101 can provide an RFID capability in its own right, while the tamper tracks 102 can modify the RFID performance of the layer 101 depending on whether said tamper tracks 102 are damaged or not.

The RFID capability provided by the layer 101, or the layers 101 and 102 together, usually includes the ability to store information in the RFID memory chip in the layer 101, and the ability to read and modify said stored information from a distance. Additional capabilities, such as the ability to encrypt stored information or control access to the stored information, may also be provided.

The third layer 103 may be an adhesive layer, which in some embodiments is a pressure sensitive adhesive.

The fourth layer 104 is a top-coat layer applied over the top of the RFID layer 101. The top-coat may be applied to protect the RFID layer and to provide a top surface to accept a printing process. The top-coat layer 104 is not essential and in some embodiments may not be included. The finished construction is the adhesive label 100.

The tamper tracks 102 should be destructible. When the label 100 is applied to a surface and subsequently tampered or removed, the pressure sensitive adhesive 103 damages the tamper tracks 102—for example, by tearing all or part of them from the underside of the layer 101—which in turn affects the RFID performance of the label 100. Since the tamper tracks 102 are electrically connected to the RFID components in the label 100, and may form part of the RFID components of the label 100, the RFID function of the label 100 is modified if the label is applied to a surface and subsequently tampered or removed. In this way tampering with or removal of the label 100 can be detected at a distance via the change in the RFID characteristics and response of the label 100.

The terms "tampering" and "tampered" as used herein refer to complete or partial removal of a tamper indicating label, such as the label 100, from a surface to which it has been applied.

In this document the term "destructible" is used in relation to the tamper tracks 102 in FIG. 1 and in relation to other tamper tracks throughout the document. In this context the term destructible means that the tamper tracks are designed to be damaged or broken in regions of the label which are tampered.

The term "conductive track" is defined herein as any circuit feature conducting electricity. Tamper tracks, destructible electronics, antennae and through hole interconnects are all forms of conductive tracks.

The tamper tracks 102 may be produced in one of a number of different ways. In one preferred embodiment, the tamper tracks may be produced by printing electrically conducting ink (such as a carbon/graphite based conductive ink or a precious metal ink). In another preferred embodiment the tamper tracks 102 may be produced using electrically conductive adhesive. In another embodiment the tamper tracks may be metallic tracks made of Aluminum, Copper or some other suitable metal.

In general the tamper tracks 102 should be made from a material, such as an electrically conducting ink, which has appropriate electrical properties but which does not have high intrinsic physical strength. In this way the tamper tracks 102 can be more easily disrupted or damaged as the label 100 is partially or completely removed from a surface to which it has been applied.

In some preferred embodiments the destructibility of the tamper tracks 102 may be enhanced by including a thin layer of a suitable adhesion modifying coating on the underside of the layer 101 either between the layer 101 and the tamper tracks 102, or between the tamper tracks 102 and the adhesive 103. At least a part of the tamper tracks should contact the adhesive 103. The layer of adhesion modifying coating may be applied as a uniform layer, or in a specified pattern, or in some other manner such that the properties of the adhesion modifying coating vary across the layer 101. In some embodiments multiple layers of adhesion modifying coating may be applied to "fine tune" the properties of the final composite adhesion modifying coating.

Inclusion of a adhesion modifying coating between the RFID layer 101 and the tamper tracks 102 results in the adhesion of the layers to each other being greater or less in a particular region according to whether the adhesion modifying coating is present or absent in that region. Similarly, inclusion of an adhesion modifying coating between the tamper tracks 102 and the adhesive layer 103 results in the adhesion of the layers to each other being greater or less in a particular region according to whether the adhesion modifying coating is absent or present in that region. Usually, but not necessarily, the adhesion modifying coating reduces the adhesion of two layers, which it separates, so that the two layers can be more easily separated.

The relative adhesion between the layer 101, adhesion modifying coating, tamper tracks 102 and adhesive layer 103 can be adjusted so that when the label 100 is applied to a surface and subsequently tampered or removed, the tamper tracks 102 are damaged in a pattern corresponding to the pattern of the adhesion modifying coating. In some embodiments the tamper tracks 102 may be physically separated in a pattern corresponding to the pattern of the adhesion modifying coating, with some of the tamper tracks 102 remaining on the layer 101 and the remainder of the tamper tracks 102 remaining on the adhesive layer 103. This damage to the tamper tracks 102 may affect the RFID performance of the label 100.

The adhesion modifying coating may be a layer of lacquer, or a layer of tamper indicating varnish (for example, similar to that used in some visual tamper indicating label constructions), or a layer of some other suitable material formulation.

Figures 1, 12A:
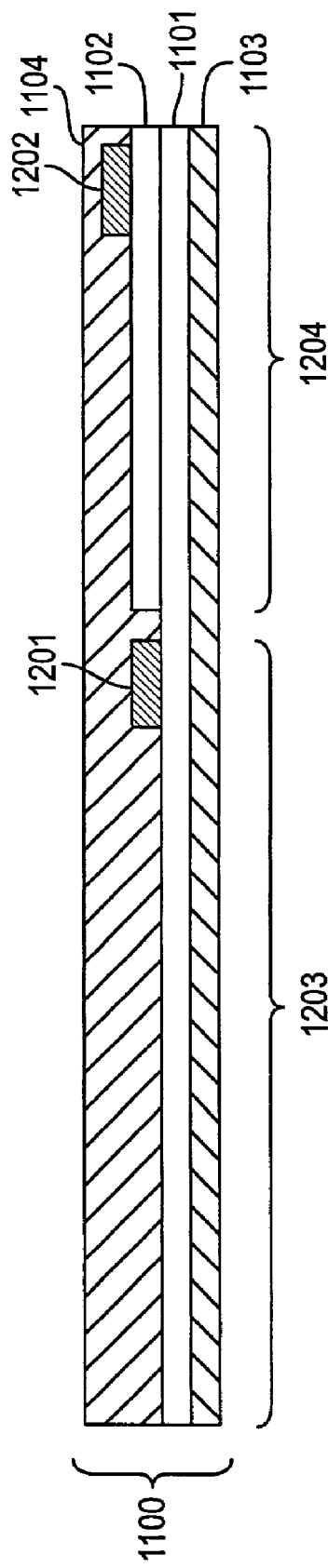
FIGS. 12A(1), 12A(2) and 12B are schematic illustrations of the side view of a preferred embodiment involving two RFID transponders.
Figures 2, 12A:
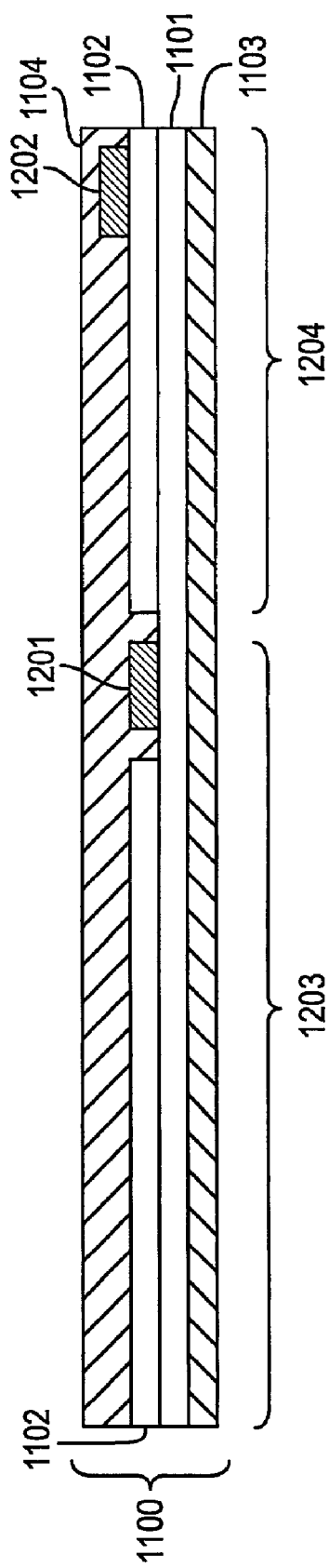

The tampering indicating characteristics of one preferred embodiment of the label 100 are illustrated in FIG. 2, which shows the label 100 in cross section view before and after removal from a surface 201. FIG. 2 illustrates in particular the physical disruption of the tamper tracks 102 during tampering or removal of the label 100. In FIG. 2A the label 100 is shown before removal from the surface 201. Here the tamper tracks 102 are intact and the label 100 exhibits its normal RFID operation. In FIG. 2B the label 100 has been partially removed from the surface 201. As the label 100 is removed, portions of the tamper tracks 102 remain with the top layer 101, and complementary portions of the tamper tracks 102 remain with the adhesive layer 103. The differential separation of the tamper tracks 102 may in some embodiments be enhanced or achieved through the inclusion of an adhesion modifying coating (as described above) in a specified pattern at the interface between the layer 101 and the tamper tracks 102, such that the tamper tracks 102 bond less strongly to the layer 101 where the adhesion modifying coating has been applied and therefore in such regions the tamper tracks 102 remain with the adhesive layer 103 when the label 100 is removed from the surface 201. As the label 100 is removed from the surface 201, the tamper tracks 102 are damaged, and their electrical properties are thereby affected. This in turn affects the RFID properties of the label 100, since the tamper tracks 102 are electrically connected to the layer 101 which includes RFID components. In FIG. 2 the separation of (i.e. damage to) the tamper tracks 102 during tampering of the label 100 is shown to form a regular repeating pattern. It should be appreciated that the pattern of the separation may instead be irregular and may be on a larger or smaller scale relative to the size of the label 100 or the RFID components in the label 100 than shown in FIG. 2.

Figure 3A:
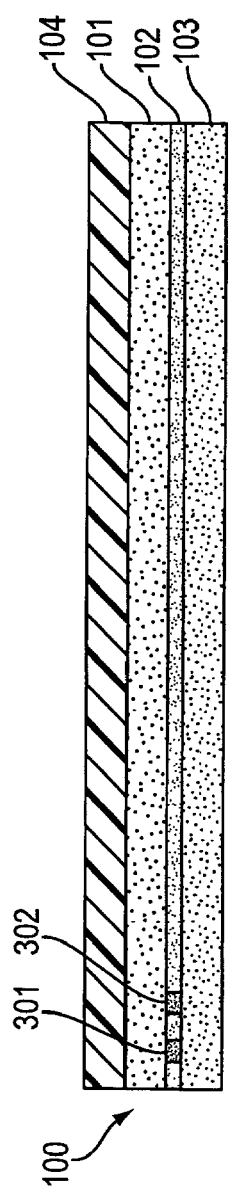
FIGS. 3A–3B are schematic illustrations of a preferred embodiment of the tamper indicating conducting track in the tamper indicating layer of a tamper indicating RFID label.
Figure 3B:
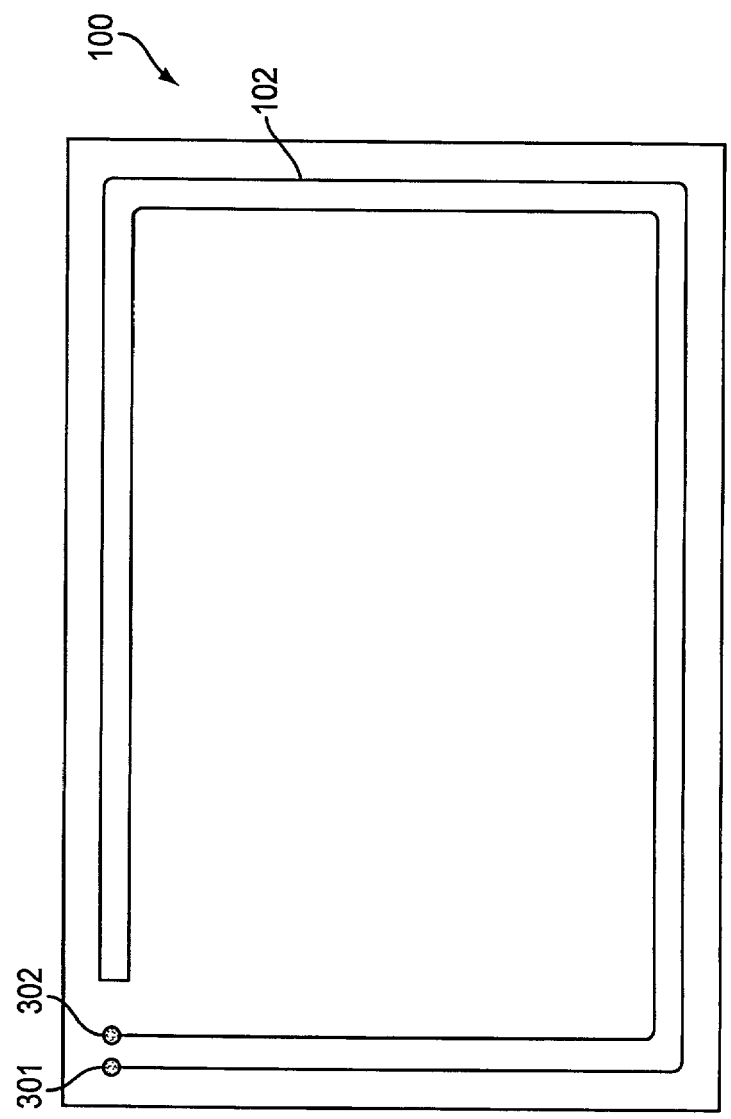

A preferred embodiment of the tamper tracks 102 will now be described with reference to FIG. 3, which shows an embodiment of the RFID label 100 in cross sectional view (FIG. 3A) and looking from below through the adhesive layer 103 at the tamper tracks 102 (FIG. 3B). In FIG. 3 the RFID layer 101 has two "through-connect" electrical connection points, 301 and 302, where the electrical circuitry in the RFID layer 101 is connected to the underside of the layer 101. In this embodiment the electrical connection between the points 301 and 302 by means of the tamper track 102 should be intact in order to maintain normal RFID operation of the label 100.

Preferably the tamper track 102 may be disrupted even if only a portion of the label 100 is tampered. In FIG. 3 the tamper track 102 runs around the perimeter of the underside of the layer 101 between points 301 and 302. The configuration for the tamper track 102 illustrated in FIG. 3 ensures that tampering of even a small portion of the label 100 will result in a break in the tamper track 102 and therefore a break in the electrical connection between the points 301 and 302, which in turn modifies the RFID behavior of the label 100.

It should be appreciated that other configurations of the tamper track 102 could also be employed. For example, in some embodiments the tamper track 102 may form all or part of an antenna, in which case the points 301 and 302 may not be electrically connected to each other via a single tamper track 102.

An RFID label will generally include an electronic memory chip connected to either an induction loop or an antenna. The induction loop or antenna may enable communication and data exchange with a remote reading device. (It should be appreciated that different types of antenna design may be employed.) Other electrical or electronic components may also be included in an RFID label. An active RFID label will include an on-board power source such as a battery.

Preferred embodiments of ways in which the tamper tracks 102 can be configured on the underside of the RFID layer 101 and coupled to the RFID layer 101 will be now be described by way of non-limiting example. It should be appreciated that in some embodiments the tamper tracks 102 may be designed to be destructible in some regions and durable in other regions. For example, the tamper tracks 102 may include some sections, which are durable and rugged, joined by sections which are destructible.

The tamper tracks 102 may be connected in one of several different ways to the RFID layer 101, depending on the design and operation of the RFID layer 101. Several non-limiting examples are listed below.

1. The tamper tracks 102 may be connected in series with an induction loop or antenna in the layer 101.

2. The tamper tracks 102 may constitute all or part of the induction loop or antenna of the label 100.

3. The tamper tracks 102 may be part of a tamper-sensing electrical circuit in the label 100, which is separate from the induction loop or antenna of the label 100.

FIGS. 4 to 7 are schematic illustrations of further preferred embodiments of the tamper indicating RFID label 100, showing both a cross sectional view and a view looking from below through the adhesive layer 103 at the tamper tracks 102.

FIG. 4 is a schematic illustration of a preferred embodiment in which the tamper track 102 connects the points 301 and 302 and is in series with an induction loop 401 in the RFID layer 101. The RFID layer 101 may include the induction loop 401 and other components 402, which may be passive or active. For example, the components 402 in one embodiment may be a capacitor which, with the induction loop 401, forms a resonant electrical circuit. Alternatively, the components 402 may include a passive electronic memory chip for storing data. The tamper track 102 should be intact for the RFID label 100 of FIG. 4 to be operational. When the label 100 is tampered, the tamper track 102 is broken and the RFID function of the label 100 can be disabled or modified. In this way it can be determined whether or not the label 100 has been tampered. An adhesion modifying coating may be included, as described above, to enhance destructibility of the tamper track 102.

FIG. 5 is a schematic illustration of another preferred embodiment in which the tamper track 102 forms an induction loop 501 for the RFID label 100. In FIG. 5 the through-connect points 301 and 302 are connected to the RFID components 402 in the layer 101. In connecting the points 301 and 302, the tamper track 102 forms a number of loops, with the overall layout of the tamper track 102 acting as an induction loop. Tampering or removing the label 100 results in a break in the tamper track 102, thereby disabling or modifying the RFID function of the label 100. In this way it can be determined whether or not the label 100 has been tampered. An adhesion modifying coating may be included, as described above, to enhance destructibility of the tamper tracks 102.

FIG. 6 is a schematic illustration of another preferred embodiment, which is a variation on the embodiment of FIG. 5. In FIG. 6 the tamper tracks 102 form an antenna, whereas in FIG. 5 the tamper track 102 forms an induction loop. The principal difference is that in FIG. 6 the points 301 and 302 are not connected together by a single tamper track 102. Instead there are two tamper tracks 102, one starting at point 301 and the other starting at the point 302. The two tamper tracks 102 form an antenna. In FIG. 6 a so-called meander antenna is illustrated, although it should be appreciated that other forms of antenna may also be employed. In some antenna designs the points 301 and 302 may be connected to each other by the tamper track 102. In FIG. 6 the through-connect points 301 and 302 are connected to the RFID components 402. Tampering the label 100 should result in damage to at least one of the tamper tracks 102, thereby affecting the characteristics of the antenna and modifying or disabling the RFID function of the label 100. In this way it can be determined whether or not the label 100 has been tampered. An adhesion modifying coating may be included, as described above, to enhance destructibility of the tamper tracks 102.

FIG. 7 is a schematic illustration of another preferred embodiment, based on the embodiments of FIGS. 5 and 6. The principal difference between the designs illustrated in FIGS. 5 and 6, and the design illustrated in FIG. 7 is that in the design of FIG. 7 the RFID components 402 are on the underside of the layer 101. In some embodiments the RFID components 402 may comprise only an RFID memory chip, in which case in the design of FIG. 7, both the RFID memory chip 402 and the tamper tracks 102 are on the underside of the layer 101. The tamper tracks are designed to be destructible, as described herein. An advantage of the design of FIG. 7 compared with the designs of FIGS. 5 and 6 is that in the design of FIG. 7 there is no need for through-connects to the bottom side of the layer 101, since the RFID memory chip is on the bottom side of the layer 101. In the design of FIG. 7 the tamper tracks 102 may form an induction loop, as in the design of FIG. 5, or may form an antenna, as in the design of FIG. 6. In FIG. 7 an antenna is shown. An adhesion modifying coating may be included, as described above, to enhance destructibility of the tamper tracks 102.

In order to provide an additional indicator of tampering, the label 100 may be designed to show visual evidence of tampering if the label is removed from a surface to which it has been applied. Visual tamper indication can be achieved in several ways. In one embodiment a thin colored layer is applied to the underside of the RFID layer 101. A pattern of adhesion-modifying layer may be applied to the underside of the colored layer. The adhesion-modifying layer may be the same layer or a layer in addition to the adhesion modifying coating described above. The presence of the adhesion-modifying layer modifies the adhesion of the colored layer to the adhesive layer 103 such that when the label 100 is removed from a surface to which it has been applied, the colored layer breaks up. Areas of color may adhere to the adhesive layer 103 and other complementary areas of color may adhere to the RFID layer 101. An alternative to this embodiment is to apply a pattern of said adhesion modifying layer directly to the underside of the RFID layer 101 and apply said thin colored layer to the underside of said adhesion modifying layer. In another embodiment, the adhesion modifying coating may be applied directly to the underside of the RFID layer 101 and a colored adhesive can be used as the adhesive layer 103. In this case, when the label is removed from a surface to which it has been applied, the colored adhesive 103 should break up and areas of the colored adhesive may adhere to the RFID layer 101 and complementary areas of the colored adhesive 103 may adhere to the surface. It should be appreciated that other methods may be used to produce a visual tamper indicating effect.

When using a visual tamper indicating effect, a portion of the RFID layer 101 and top coat 104 (if a top coat 104 is present) should be transparent so the visual effect can be seen by looking through the RFID layer 101 and top coat 104. This enables easy inspection of the visual tamper indicating feature without having to remove the label. The RFID components in the RFID layer 101, such as a memory chip, may not be transparent, but should only occupy a small portion of the surface area.

Tamper Indicating RFID Label with Tracking Capability

Figure 8A:
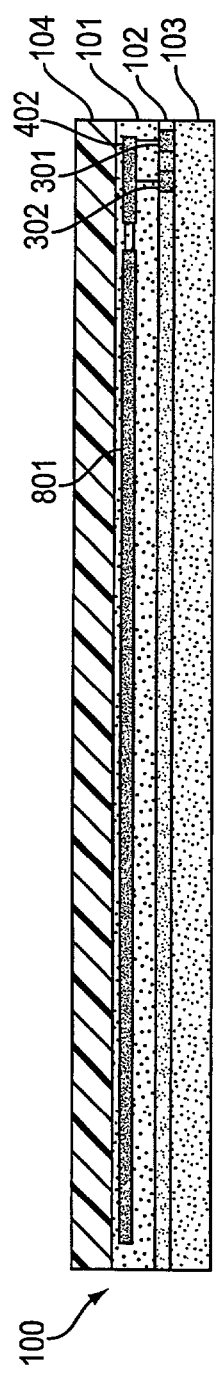
FIGS. 8A–8B are schematic illustrations of another embodiment of the invention.
Figure 8B:
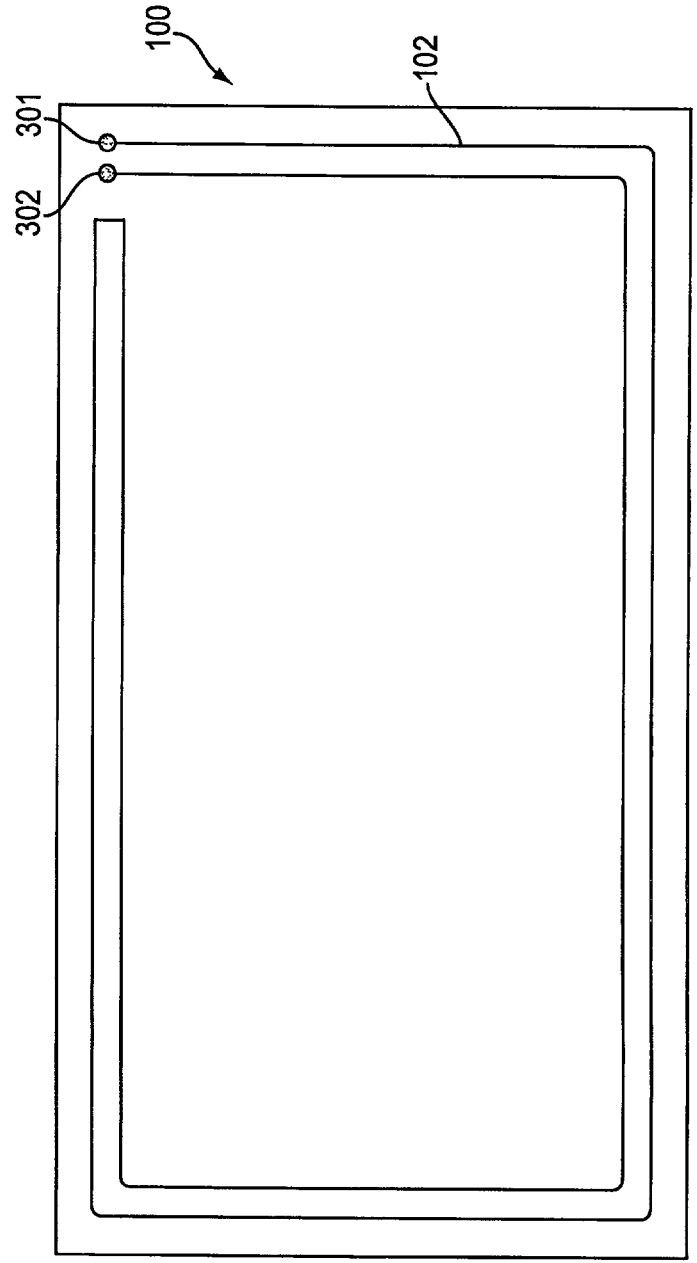

FIG. 8 is a schematic illustration of another preferred embodiment in which the tamper track 102 forms part of a separate tamper indicating electrical circuit. As shown in FIG. 8 the RFID layer 101 may contain an induction loop or antenna 801 and other electronic components 402, including an electronic memory chip, to provide an RFID capability. The RFID layer 101 should be capable of interacting with an RFID reading device to allow reading of or modification to data stored in the electronic memory chip. The through-connect points 301 and 302 are connected to the components 402 in the layer 101, and to each other via the tamper track 102. The components 402 should be configured to respond differently to a signal from an RFID reader depending on whether or not the points 301 and 302 are connected to each other via the tamper track 102 or not. If the tamper track 102 is intact, the label 100 will respond in a specified manner to an RFID reader. On the other hand, if the label 100 is tampered, so that the tamper track 102 is damaged and the points 301 and 302 are no longer connected to each other via the tamper track 102, the label 100 should still respond to an RFID reader but in a different manner, thereby indicating that the label 100 has been tampered. In this way the label 100 of FIG. 8 can provide an RFID means to (i) determine whether the label 100 is present, (ii) read data from the label 100 and modify data stored in the label 100, and (iii) determine whether the label 100 has been tampered. In one preferred embodiment the components 402 may consist only of a passive RFID electronic memory chip, and the tamper track 102 forms a connection, which may be separate from the induction loop or antenna 801, between two contact points on the memory chip. An adhesion modifying coating may be applied between the RFID layer 101 and the adhesive layer 103, in a manner as described in relation to FIGS. 1 to 7.

In a variation on the embodiments described above, the components 402 may undergo an irreversible change if the label 100 is tampered and the tamper track 102 is damaged, so that even if the tamper track 102 is subsequently restored, the label 100 will still respond to an RFID reader with a signal indicating it has been tampered. In one preferred embodiment the RFID components 402 is "active" (i.e. powered) and is configured to test the integrity of the tamper track 102 either continuously or at specified intervals. In this embodiment if the RFID components 402 detect that the tamper track 102 has been disrupted they may then preferably be configured to record data to this effect in the electronic memory chip within the components 402, preferably in a manner which is permanent and irreversible. Preferably, if the components 402 are active, they may also include a clock. In this case, the date and time of any tampering of the tamper track 102 or label 100 may also preferably be recorded permanently and irreversibly in the electronic memory chip within the RFID components 402.

A preferred embodiment of the tamper indicating RFID label configuration of FIG. 8 will now be described by way of non-limiting example with reference to the schematic illustrations shown in FIG. 9.

It should be appreciated that the term antenna as used below may refer to a conventional antenna or to an induction loop (which is used as an antenna at some RFID operating frequencies).

Figure 9A:
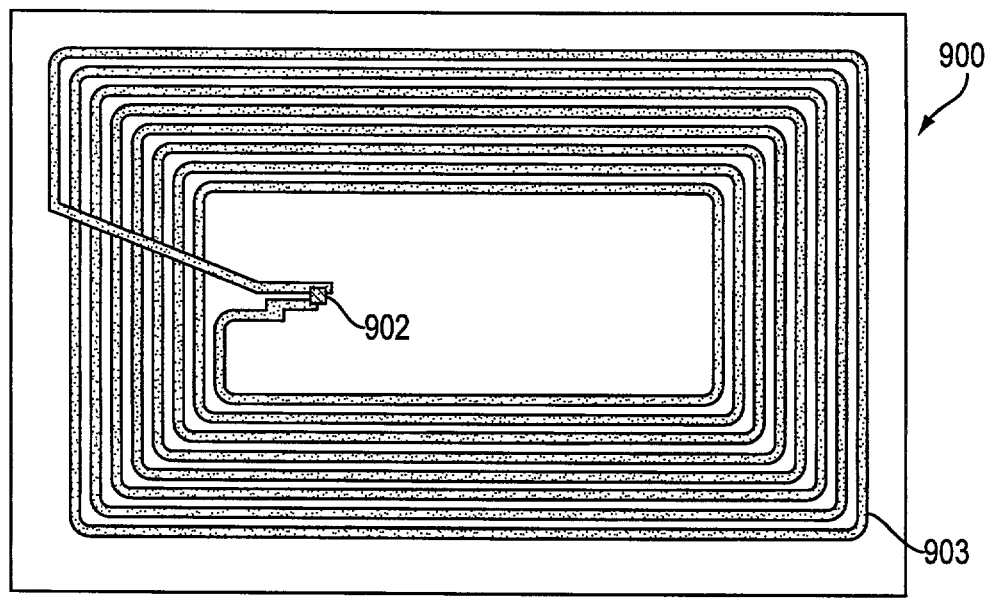
FIGS. 9A, 9B and 9C are a schematic illustration of the top view, side view and bottom view of a preferred embodiment of a tamper indicating RFID label which is the subject of the present invention.
Figure 9B:
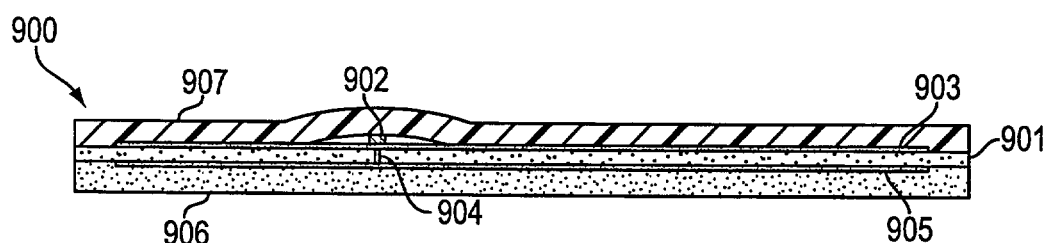
Figure 9C:
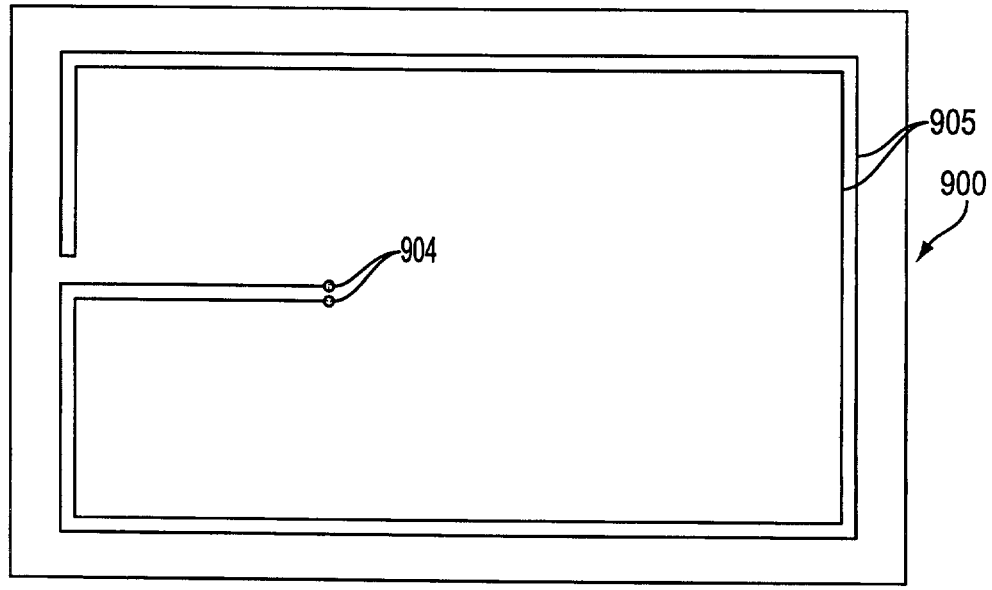

FIG. 9 is a schematic illustration of a tamper indicating RFID label 900 shown in top view (FIG. 9A), cross sectional side view (FIG. 9B), and bottom view (FIG. 9C).

The label 900 may include a substrate layer 901 made of, for example, polyester or some other suitable material. On top of the substrate layer 901, electronics to form an RFID transponder, which provides an RFID function, may be applied. The electronics may include an RFID electronic memory chip 902 and an antenna 903. (In FIG. 9 an antenna 903 in the form of an induction loop is shown.)

Figure 9D:
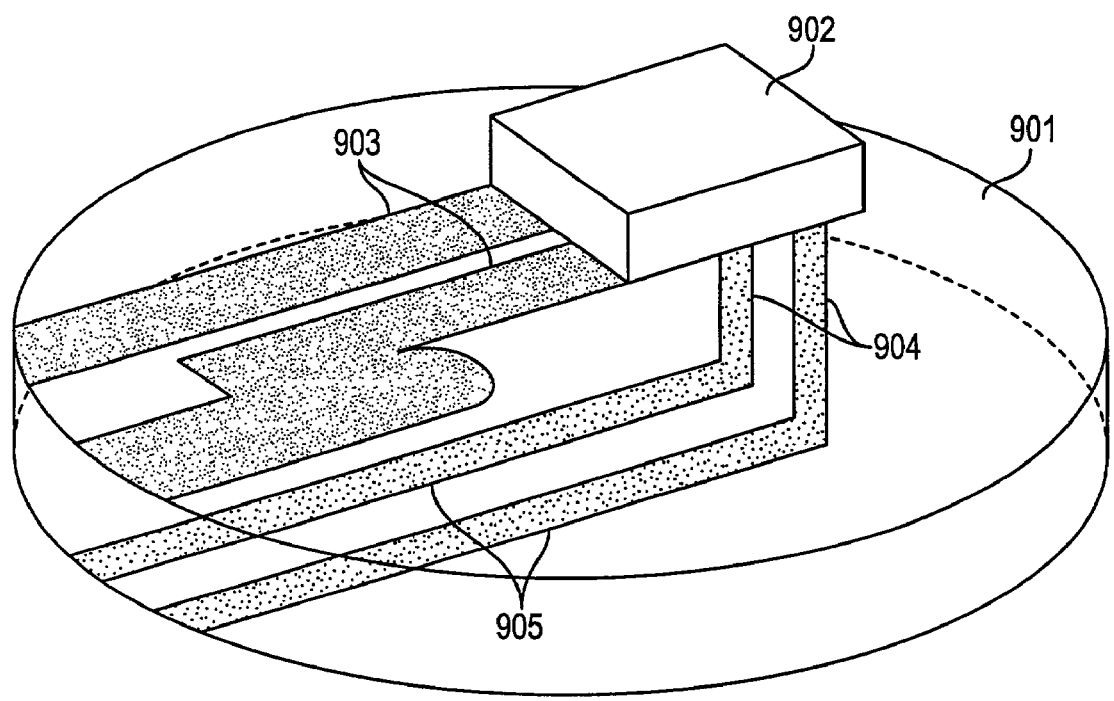
FIG. 9D is a schematic illustration of the detail of a portion of the tamper indicating RFID label of FIG. 1.

FIG. 9D is a more detailed schematic illustration of an example of the electrical connections to the electronic chip 902.

The chip 902 and antenna 903 should provide an RFID capability, which may include the ability to store information in the chip 902, the ability to read information from the chip 902 at a distance using a suitable RFID device, and the ability to modify information in the chip 902 from a distance using a suitable RFID device.

The chip 902 may include two contact points, or contact pads, connected to the antenna 903, as illustrated in FIG. 9D.

Two contact pads on the chip 902 can be connected via electrical "through-connects" 904 to the underside of the substrate layer 901. One or both or neither of these two contact pads may be the same as the contact pads used to connect the chip 902 to the antenna 903. FIG. 9D shows the through-connects 904 directly beneath the chip 902. It should be appreciated that other configurations may instead be used for the through-connects 904. In another preferred embodiment, the through-connects 904 are positioned away from the contact pads on the chip 902, and electrical tracks on the top surface of the substrate layer 901 connect the contact pads on the chip 902 to the tops of the through-connects 904.

The two through-connect points 904 on the underside of the substrate layer 901 are connected to each other by means of a tamper track 905 which is positioned on the underside of the substrate layer 901.

A layer of adhesive 906 may also be applied to the underside of the substrate layer 901 and tamper track 905. Preferably said adhesive 906 is a pressure sensitive adhesive.

A top layer 907 may be applied over the top of the substrate 901, chip 902 and antenna 903. The top layer 907 can provide protection for these components and can also provide a surface to accept printing—for example printing of a number, a barcode, a logo, or other image.

It should be appreciated that in FIG. 9 the top view (FIG. 9A) is a view looking through the top layer 907, the side view (FIG. 9B) is a cross sectional side view, and the bottom view (FIG. 9C) is a view looking though the adhesive layer 906.

The tamper track 905 is preferably applied to the underside of the substrate layer 901, along with one or more layers of adhesion modifying coating to enhance the destructibility of the tamper track 905. Consequently, if the label 900 is applied to a surface and subsequently removed, the tamper track 905 should be broken or disrupted so as to interrupt the electrical connection between the through-connect points 904 on the underside of the substrate layer 901. Application of the tamper track 905 and any other adhesion modifying coatings to the underside of the substrate 901 to enhance the destructible nature of the tamper track 905 may preferably be carried out as described herein and in the above-identified provisional patent applications, which are incorporated by reference.

The tamper track 905 may be laid out in a number of different ways on the underside of the substrate layer 901. In the preferred embodiment illustrated in FIG. 9, the tamper track runs from one through-connect point 904 almost all the way around the perimeter of the underside of the substrate layer 901 and then back to the other through-connect point, with the outward and return paths of the tamper track 905 very close together in order to avoid any electrical induction effects which may interfere with the antenna 903 positioned above on the upper surface of the substrate layer 901. The width and thickness of the tamper track 905 can be adjusted to provide the correct properties in terms of electrical resistance and physical destructibility. The path made by the tamper track 905 may run inside, or outside, or directly beneath the antenna 903, which in FIG. 9 is an induction loop. In one preferred embodiment the tamper track 905 forms a path which is outside the outer perimeter of the induction loop 903, thereby ensuring that any disturbance around the perimeter of the label 900 will cause the tamper track 905 to be disrupted.

When the label 900 is applied to a surface, the tamper track 905 is intact and the corresponding contact pads on the chip 902 are electrically connected to each other. When the label 900 is removed or substantially tampered with, the tamper track 905 should be broken or disrupted and there will then be an open circuit between the corresponding contact pads on the chip 902. When such an open circuit occurs, the function of the RFID chip 902 or the information stored in the chip 902 will be modified in a way which can be detected by an RFID reader.

If the label 900 is passive (i.e. without an on-board battery or other power source), the modified chip function or information can be detected during the first read operation of the label after the label 900 is removed or tampered, and the reader (if it has a write capability) can be programmed to write data back to the chip 902 to indicate that the label 900 has been removed or tampered. Said data which is written back to the chip 902 to indicate removal or tampering of the label 900 is preferably permanent and irreversible, to prevent the memory contents of the chip being altered back to the original state to disguise the fact that the label has been moved or tampered. There is therefore disclosed herein an RFID read/write device capable of detecting the change in RFID performance of the label 900 when the label 900 is tampered, and writing data back to the chip 902 within the label 900 to indicate such tampering has occurred, said data preferably being written into the chip 902 so as to be permanent and irreversible.

If the label 900 is active (i.e. has an on-board battery or other power source), it can be configured such that any disruption to the tamper track 905 can be detected internally within the label 900 without requiring an RFID read operation. When such disruption to the tamper track 905 is detected internally, the chip 902 can be programmed to modify its own memory contents to indicate that the label 900 has been removed or tampered. Said modification to the memory contents of the chip 902 to indicate removal or tampering of the label 900 should preferably be permanent and irreversible, to prevent the memory contents of the chip being altered back to the original state to disguise the fact that the label has been moved or tampered.

Hence the label 900 may function as a normal REID label when it is first applied to a surface. After the label 900 is moved or tampered, the RFID function of the label 900 may be maintained and information can be read from and written to the REID chip 902, while the label also provides an RFID means to determine that it has been moved or tampered.

Achieving Desired Adhesion Characteristics via Adhesion Modifying Coating Pattern Controlling the relative adhesion between the layers of the transponder construction is critical to achieving the desired performance of the above-described tamper indicating device. The reasons for this and the methodologies to achieve are presented by means of a non-limiting example of a particular preferred embodiment. It is appreciated that the same concepts presented here apply to other embodiments as well.

FIG. 10 is a schematic illustration of a tamper indicating RFID label 900 as shown in FIG. 9. FIG. 10A illustrates a top view of the antenna layer 903 and the RFID device 902, and FIG. 10C illustrates a bottom view of the tamper track layer 905 and the through connects 904. FIG. 10B illustrates a side view with the adhesion modifying layer 1001 specifically shown. In this embodiment, the adhesion modifying layer 1001 is applied to the bottom of substrate 901, between the substrate 901 and tamper track 905. Additionally, a release liner layer 1002 is shown on the bottom side of adhesive layer 906. This release liner layer is typically applied during the fabrication of the tamper indicating RFID label 900 and subsequently removed when the said label is applied to an object. The purpose of the release liner is to carry the RFID label 900 and prevent the adhesive layer 906 from inadvertently adhering to any surface prior to the label 900 being applied to a surface or object.

In the configuration shown in FIG. 10, the adhesion modifying layer 1001 is designed such that its adhesion to the substrate 901 is weaker than that of tamper track. The tamper track will preferably have substantially strong adhesion to the substrate 901 and to the adhesion modifying layer 1001. The adhesion of the tamper track 905 to the substrate 901 will preferably be stronger than the adhesion of the adhesive layer 906 to the tamper track 905. Hence when the transponder construction 900 is attached to a surface and subsequently removed, the adhesion modifying layer 1001 will fail (i.e., separate) at the interface to the substrate 901, thereby transferring the adhesion modifying coating 1001 and portions of the tamper track 905 in contact with the adhesion modifying coating 1001 to the adhesive layer 906. Where there is no adhesion modifying coating 1001, the adhesive layer 906 will separate from the tamper track 905, leaving those regions of the tamper track 905 in contact with the substrate 901.

It is also appreciated that the adhesion of the adhesion modifying layer 1001 to the substrate 901 must be sufficiently strong to prevent delamination or separation between the said layers during the transponder manufacturing processes, subsequent handling, removal of the release liner layer 1002 and application to the intended surface. During the various manufacturing processes, the tamper indicating transponder 900 is subjected to thermal, mechanical and other stresses. Examples of these include, but are not limited to the following: application of subsequent layers, thermal or radiation exposure, mechanical assembly, die cutting, splicing, hole formation, slitting, unwinding rewinding. The transponder may also be subjected to thermal and mechanical stresses during handling and shipping. When the release liner layer 1002 is removed from adhesive layer 906, a stress is applied to the adhesion modifying coating layer 1001, the tamper track layer 905 and adhesive layer 906. The relative adhesion between these said layers must be sufficiently strong as to prevent delamination between any of them during the removal of the release liner layer 1002.

The adhesion of the adhesion modifying layer 1001 to the substrate 901 can be controlled by the formulation of the adhesion modifying material, as will be discussed in a following section of this patent, as well as by the features of the release coating layer 1001 pattern. Examples of these features include, but are not limited to the following: regions containing geometric shapes of solid areas of adhesion modifying coating, regions containing geometric shapes completely absent of adhesion modifying coating, and regions containing an alternating pattern of geometric features with and without adhesion modifying material.

Figure 10A:
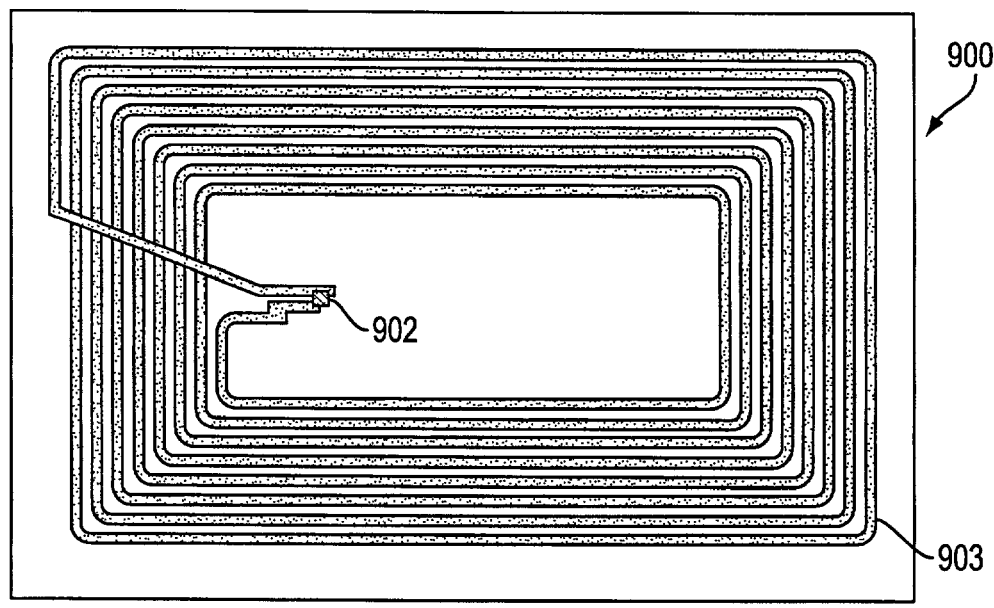
FIGS. 10A, 10B and 10C are schematic illustrations of the top view, side view and bottom view of a preferred embodiment of a tamper indicating RFID label which is the subject of the present invention.
Figure 10B:
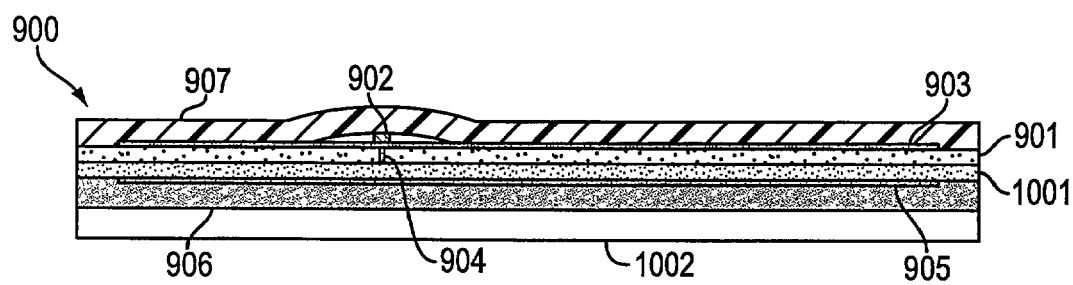
Figure 10C:
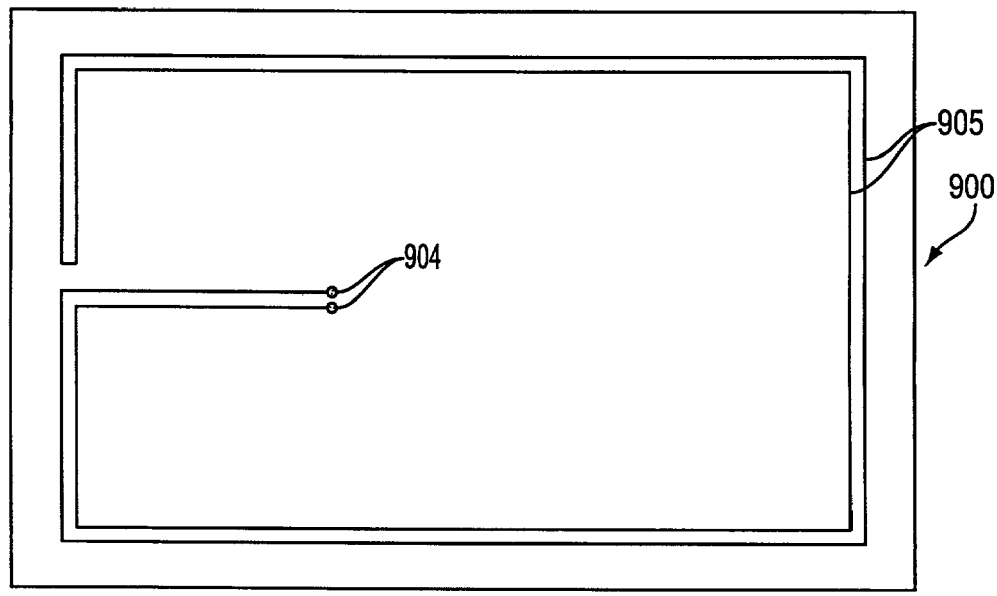
Figure 10D:
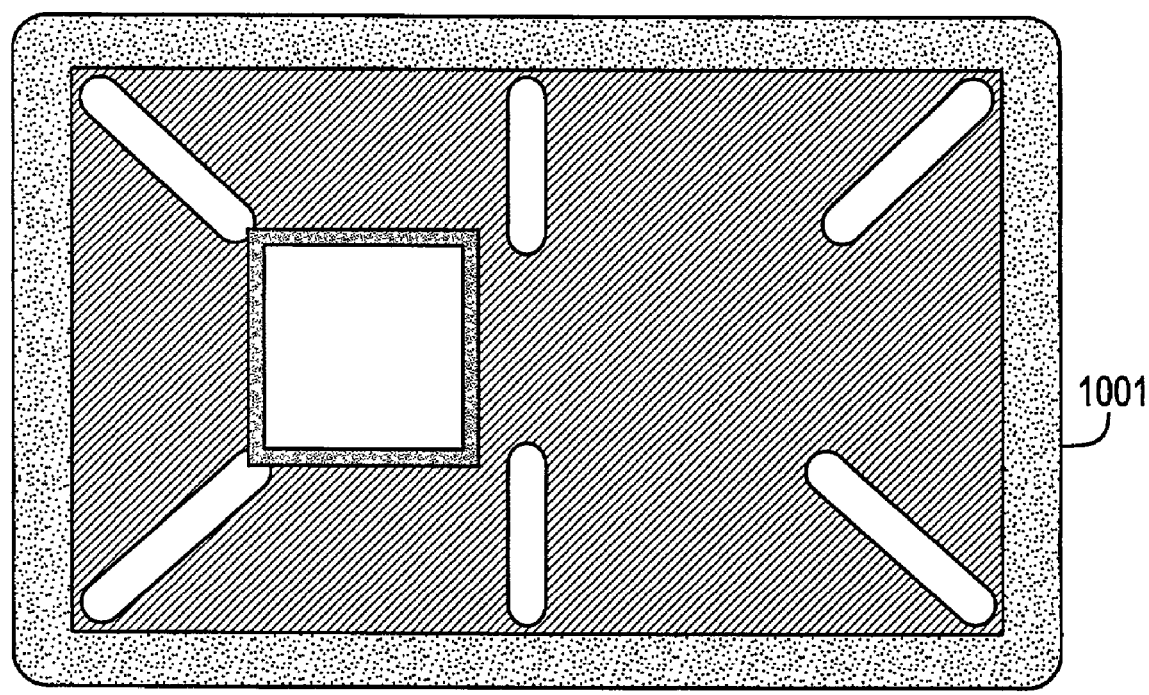
FIG. 10D is a schematic illustration of a preferred embodiment of the adhesion modifying layer pattern.

FIG. 10D illustrates an example of a preferred embodiment of the adhesion modifying layer 1001 pattern as viewed from the bottom of the tamper indicating RFID label 900 through the adhesive layer 906 (not shown) and release liner layer 1002 (not shown).

It can be seen from FIG. 10D that the adhesion modifying layer 1001 pattern contains the following features: a grid pattern comprised of lines and spaces, a solid border at the perimeter of the substrate layer 901, relatively large regions absent of any adhesion modifying coating. Each of these features is now discussed in further detail.

In the referenced example, the grid pattern is comprised of lines and spaces, oriented at an angle relative to the perimeter of the substrate layer 901. It is appreciated that there are many angles at which the pattern may be oriented relative to the perimeter and/or the tamper track. Angles of 90°, 45° and 22.5° are examples. The angle affects the printing of the adhesion modifying layer during manufacturing as well as the release (destruction) characteristics during application. The width of the lines and spaces can be varied to adjust the dimensions of the area of substrate 901 covered by the adhesion modifying coating layer 1001 versus the dimensions of the area of substrate 901 in direct contact with the tamper track layer 905. A relatively large area of substrate 901 in direct contact with the tamper tack layer 905 (low adhesion modifying coating density) will produce a relatively strong adhesion between these two layers and therefore generate an overall construction more resistant to inadvertent delamination while simultaneously less susceptible to destruction of the tamper track layer 905 in the application. Conversely, a relatively large area of substrate 901 covered by adhesion modifying coating layer 1001 (high adhesion modifying coating density) will generate an overall construction more susceptible to inadvertent delamination but also more likely to result in the intended destruction of tamper track layer 905 in the application.

In addition to a grid, other adhesion modifying coating patterns can be employed, including but not limited to patterns of lines, dots, and other geometric shapes with the adhesion modifying coating, with the same or different shapes in the regions with adhesion modifying coating. It is appreciated that the dimensions of the regions with material may be different from those without material. Patterns of lines, circles and triangles have been tested. The table below provides a non-limiting example of grid patterns, which have been evaluated:

| Line Width (inches) | Gap Width (inches) | Orientation of grid to tamper track |
| --- | --- | --- |
| 0.020 | 0.020 | Orthogonal (90°/0°) |
| 0.020 | 0.030 | Orthogonal (90°/0°) |
| 0.020 | 0.040 | Orthogonal (90°/0°) |
| 0.020 | 0.020 | Angled (22.5°) |
| 0.020 | 0.030 | Angled (22.5°) |
| 0.020 | 0.040 | Angled (22.5°) |

The destructibility of layers 1001 and 905, and the level of adhesion between the label 900 and the surface to which it is applied, can also be varied across the label 900 by varying the pattern of the adhesion modifying coating layer 1001, and more specifically by varying the density of the pattern of the said adhesion modifying coating. Increasing the density of the adhesion modifying coating pattern decreases the overall adhesion strength between the label 900 and the surface to which it is applied. For example, in one preferred embodiment it may be desirable to have weaker adhesion at the perimeter of the label than at the center, in which case a higher adhesion modifying coating density will be employed at the perimeter. In some instances, the increased density may result in large regions of solid release coating, such as the solid border of layer 1001 illustrated in FIG. 10D. Conversely larger areas without adhesion modifying coating can be employed.

In some preferred embodiments, the adhesion modifying layer 1001 is applied to the substrate 901 already in the format of its final dimensions, in that the perimeter of substrate 901 is the same size as the final product label 900. In another preferred embodiment, the adhesion modifying layer is applied to the substrate layer 901 having dimensions larger than the final size of label 900, from which the label 900 is created via by cutting the substrate 901 to the final perimeter dimensions using any one of a variety of cutting processes (e.g., die cutting, laser cutting, etc.). In the latter example, the adhesion modifying coating layer 1001 may be printed larger than final perimeter dimensions, and the cutting process therefore cuts through layer 1001 in addition to the substrate layer 901, thus producing a label 900 with adhesion modifying coating extending to the perimeter.

Controlling the Fracture Plane via Adhesion Modifying Coating Pattern

If the label 900 is applied to a surface which itself is destructible (for instance, cardboard), the surface can delaminate resulting in the complete removal of the tamper indicating label 900 without destruction of the tamper track layer 906. The destruction properties of the label 900 can be further enhanced to prevent this situation by adjusting the pattern of the adhesion modifying layer pattern. FIG. 10D depicts relatively large oval shaped regions in layer 1001 absent of adhesion modifying coating. These regions are positioned diagonally at the four corners and orthogonally on two sides. It is appreciated that other shapes, positions and orientations could be employed. If, for example, the label 900 is applied to a cardboard surface and later removed, it is possible that the cardboard will begin to delaminate, with a portion of the cardboard in contact with the adhesive layer 906. The oval regions in layer 1001 absent of adhesion modifying coating will transfer the plane of fracture from within the cardboard to the intended plane between the adhesion modifying layer 1001 and substrate 901.

The use of the adhesion modifying layer pattern to control adhesion and destruction patterns has been illustrated using the particular construction of FIG. 10 wherein the tamper track is located on the opposite side of substrate 901 from the antenna 903 and the adhesion modifying layer is applied between the substrate layer 901 and the tamper track 905. It is appreciated that the same principles apply to the other previously presented embodiments involving different tamper indicating label transponder constructions. These include, but are not limited to, constructions where the tamper track is on the same side of the substrate as the antenna, the tamper track may be integral to the antenna, or the release coating is applied between the tamper track and the adhesive.

Constructions Employing a Transfer Lamination

In one preferred embodiment, the destructible electronics may be applied to the substrate layer 901 using a transfer lamination technique. In this method, the destructible pattern or tamper track layer 905 is created separately and then transfer laminated to the underside of the substrate layer 901. A bonding adhesive layer may be applied uniformly or selectively between substrate layer 901 and tamper track layer 905 to secure the said tamper track layer to the substrate. The adhesion modifying layer 1001 pattern is preferably applied immediately adjacent to the destructible electronics tamper track layer 905, either before or after the application of the tamper track layer 905 to the bonding adhesive. The resulting construction will produce differential separation of the destructible electronics upon tampering of the label 900.

In one preferred embodiment, the transfer laminated destructible electronics may be an etched or stamped piece of continuous metal (e.g., copper, aluminum). In another preferred embodiment, the transfer laminated destructible electronics may be a printed electrically conductive material that may or may not include a polymer binder.

In another preferred embodiment, the bonding adhesive may be selectively applied in a pattern to the underside of the substrate 901 such that, after transfer lamination of the tamper track layer 905, portions of the destructible layer are not attached by said bonding adhesive to the substrate 901. In this embodiment, the unattached regions of the destructible electronics lead to selective failure of the destructible electronics when the label construction 900 is tampered. In this embodiment, it may not be necessary to use an adhesion modifying coating.

In another preferred embodiment, the bonding adhesive is applied uniformly to the bottom side of substrate 901. In this embodiment, the adhesion modifying layer 1001 is required.

In another preferred embodiment, the bonding adhesive layer is applied to the bottom side of layer 901, onto which the tamper track layer 905 is applied. The adhesion modifying coating layer is applied between the tamper track layer and the adhesive layer 906. When applied after transfer lamination of the destructible electronics, the adhesion modifying coating inhibits local delamination of the destructible electronics by the adhesive layer 906 when the label construction 900 is tampered, since in this configuration said adhesive modifying coating weakens the adhesion between the destructible electronics and the adhesive layer 906.

Constructions Involving Multiple RFID Transponders

The Dual-Transponder Tamper Indicating RFID Label

Figure 11:
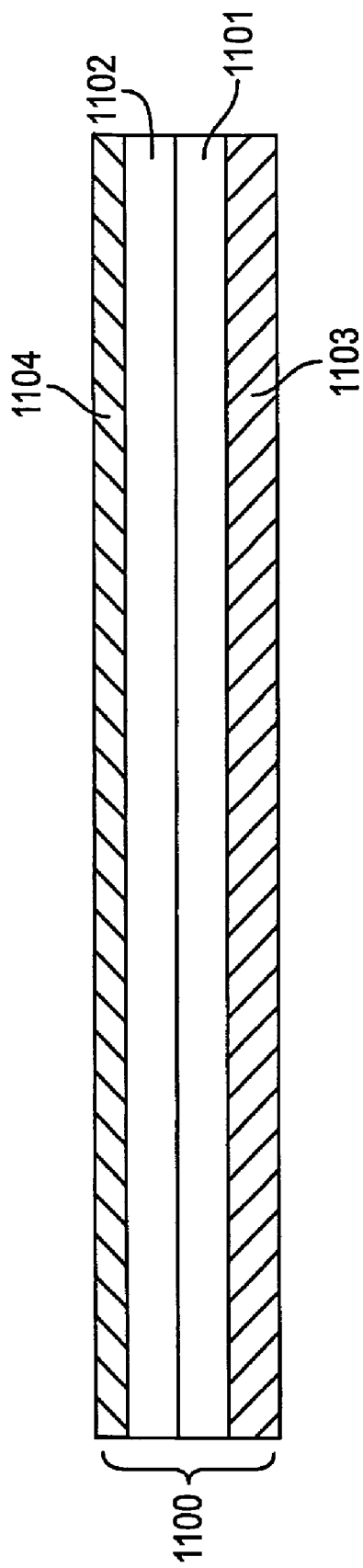
FIG. 11 is a schematic illustration of the side view of a preferred embodiment of a tamper indicating label which is the subject of the present invention.

FIG. 11 is a schematic illustration of the general design of a dual-transponder tamper indicating RFID label construction 1100. This second tamper indicating RFID label is designed such that when tampered it remains operational in an RFID sense, but provides information, via RFID means, to indicate that it has been tampered.

FIG. 11 shows said second tamper indicating RFID label 1100 schematically in cross sectional view.

The label 1100 includes a first RFID layer 1101, which is a tamper indicating RFID construction of the type described in relation to FIG. 1, so that the underside of the first RFID layer 1101 includes destructible electronics.

A second RFID layer 1102 is bonded in a permanent manner to the top surface of the first RFID layer 1101. The layer 1102 includes components to provide an RFID capability. Said second RFID layer 1102 is preferably designed to be strong and durable rather than destructible. The second RFID layer 1102 may be designed to provide a read-only RFID capability, or a read-write RFID capability, or some other RFID capability.

To the underside of the first RFID layer 1101 is applied a layer of adhesive 1103. Preferably the adhesive layer 1103 will be a pressure sensitive adhesive, although it should be appreciated that other types of adhesive layer could be used instead.

Preferably, but not necessarily, a top layer 1104 will be applied over the top of the second RFID layer 1102. The layer 1104 is included to provide physical protection for the second RFID layer 1102 and to provide a surface to accept printing processes (where appropriate).

Due to the properties of the first (bottom) RFID layer 1101, the combined construction of the FIG. 11 is tamper indicating, so that an attempt, using methods such as those described above in relation to FIG. 1, to partially or completely remove the label 1100 from a surface to which it has been applied will result either in a break in the destructible electronics of the first RFID layer 1101, or distortion to the destructible electronics, or a disruption to the connection between the destructible electronics and the RFID chip in the first RFID layer 1101, or other modification to the first RFID layer 1101 to the extent that the RFID function of the first RFID layer 1101 is modified in a manner detectable by an RFID reader or read/write device. The RFID function of the second RFID layer 1102 will preferably be unaltered by tampering of the label 1100, since damage due to tampering will usually be confined to the region of the bottom surface of the first RFID layer 1101 and the adhesive layer 1103.

Combining the First and Second RFID Layers of the Second Tamper Indicating RFID Label.

FIG. 12 illustrates schematically ways in which the first RFID layer 1101 and second RFID layer 1102 of FIG. 11 can be configured.

Usually the layers 1101 and 1102 of FIG. 11 will each include an electronic chip. Typically the chip will be significantly thicker than the rest of the layer. In the embodiments illustrated in FIG. 12 the layer 1101 includes the electronic chip 1201, and the layer 1102 includes the electronic chip 1202 which is positioned on the top surface of the layer 1102.

FIG. 12A illustrates schematically two cross sectional views of preferred embodiments of the tamper indicating RFID label 1100 in which the RFID chip 1201 is on the top surface of the layer 1101.

In FIG. 12A(1), the layer 1101 is longer than the layer 1102, and the chip 1201 is positioned to the side of, rather than underneath, the layer 1102 so as to allow the layer 1101 to be bonded evenly to the layer 1102 across the entire bottom surface of the layer 1102.

In FIG. 12A(2), the layer 1102 includes a hole and the layer 1101 is positioned under the layer 1102 such that the chip 1201 is in said hole, thereby enabling the layer 1101 to be bonded evenly to the layer 1102 across the entire bottom surface of the layer 1102. The benefit of the design of FIG. 12A(2) is that it provides a more uniform top surface to the layer 1102, on which top surface a top layer may be applied.

An adhesive layer 1103 is applied to the bottom surface of the first REID layer 1101. Preferably the adhesive layer 1103 is a pressure sensitive adhesive, although it should be appreciated that other types of adhesive layer could be used.

Preferably (but not necessarily) a top layer 1104 may be applied to the top surface of the second RFID layer 1102. The top layer 1104 may be applied in order to protect the layer 1102 and also in order to provide a surface to accept printing.

Figure 12B:
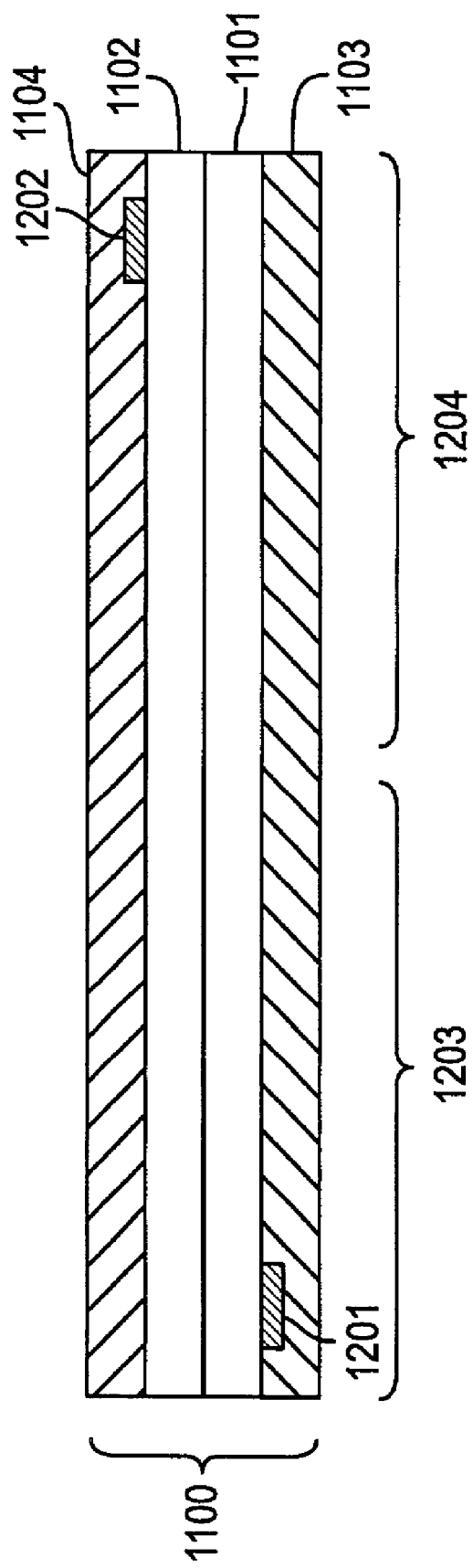

FIG. 12B illustrates schematically a cross sectional view of a preferred embodiment of the tamper indicating RFID label 1100 in which the RFID chip 1201 is on the bottom surface of the layer 1101. Hence the mating surfaces of the RFID layers 1101 and 1102 are both flat and even, and the layers 1101 and 1102 can be bonded together across the entire mating surface of the layers without difficulty.

An adhesive layer 1103 is applied to the bottom surface of the layer 1101 such that the chip 1201 and destructible electronics on the bottom surface of the layer 1101 are sandwiched between the layer 1101 and the adhesive 1103. Preferably the adhesive layer 1103 is a pressure sensitive adhesive, although it should be appreciated that other types of adhesive layer could be used.

Preferably (but not necessarily) a top layer 1104 is applied to the top surface of the layer 1102. The top layer 1104 may be applied to protect the layer 1102 and also to provide a surface to accept a printing process.

Transponder Interference

In some circumstances the performance of the RFID layer 1101 and 1102 may be adversely affected by the proximity of the other layer. This can occur especially when the antennas or induction loops in the layers 1101 and 1102 are in close proximity. In order to avoid such effects the antenna or induction loop in the tamper indicating RFID layer 1101 may in some preferred embodiments be separated laterally from the antenna or induction loop in the RFID layer 1102, rather than being placed directly beneath the antenna or induction loop in the layer 1102. This is illustrated schematically in FIG. 12B, where the antenna or induction loop of the layer 1102 is positioned in the region 1204, while the antenna or induction loop 1101 is positioned mainly in the region 1203, with some preferred embodiments also including a portion of the destructible electronics on the bottom surface of the layer 1101 extending into the region 1204 in order to provide the tamper indicating function of the layer 1101 across all portions of the label construction 1100.

Use of a Single Substrate Construction

In a variation on the preferred embodiment of FIG. 12B, the two substrates 1101 and 1102 may be replaced by a single substrate.

In one embodiment using a single substrate, the durable transponder may be fabricated directly on the top surface of said substrate and the destructible transponder may be fabricated directly on the bottom surface of said substrate. The destructible transponder may be constructed using any of the methodologies described herein.

Figure 13:
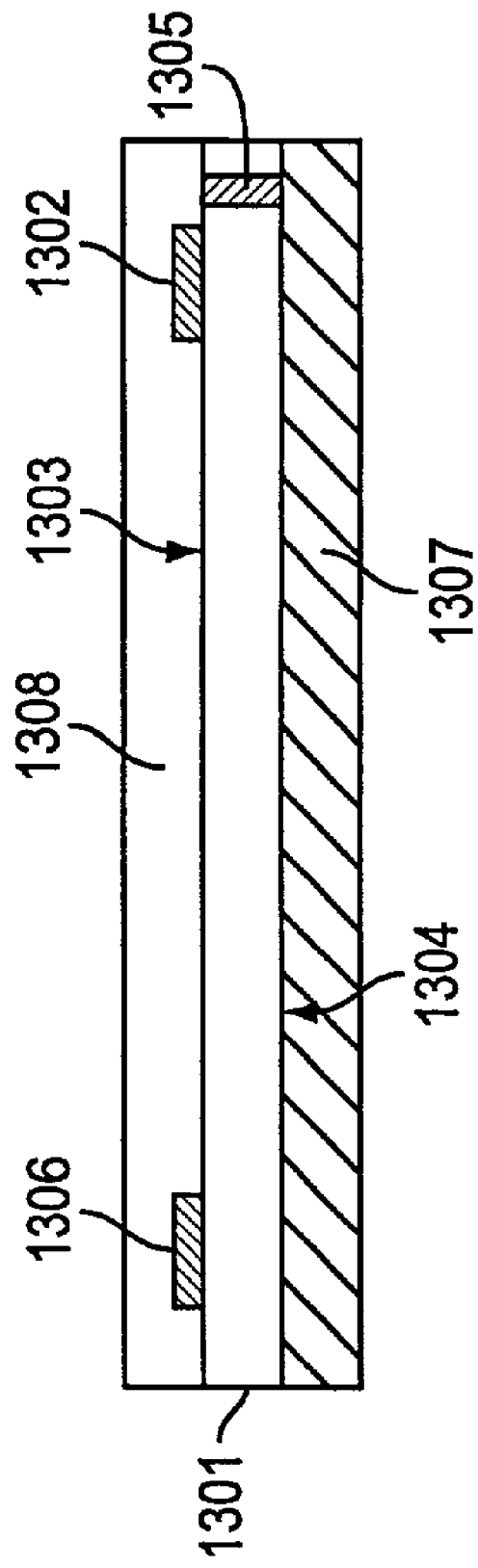
FIG. 13 is a schematic illustration of the side view of a preferred embodiment involving two RFID transponders.

There are manufacturing benefits which result from having the two electronic chips in said dual-transponder tamper indicating RFID label on the same side of the single substrate layer. This can be achieved as shown in FIG. 13, which is schematic illustration of said second tamper indicating RFID label in which both electronic chips are positioned on the top side of the single substrate layer. In FIG. 13 the electronic chip 1302 of said destructible transponder is on the top side 1303 of the substrate 1301 and the destructible electronics of said destructible transponder are on the underside 1304 of the substrate 1301, with one or more through-connects 1305 connecting the top and bottom layers 1303 and 1304 of the substrate 1301. A durable transponder is applied to the top surface 1303 of the substrate 1301, so that the electronic chip 1306 of the durable transponder is also on the top surface 1303 of the substrate 1301. An adhesive layer 1307 is applied to the underside of the substrate layer 1301.

Preferably a top layer 1308 may be applied to the top surface of the substrate 1301, such that the electronic chips 1302 and 1306 and any other electronics on the top surface 1303 of the substrate 1301 are covered over and protected. Preferably said top layer 1308 may be a layer designed to accept a printing process.

Preferably, but not necessarily, the two transponders in the construction illustrated in FIG. 13 may be displaced laterally to avoid transponder interference, as described above.

Mixed Conductor Technology

In a preferred embodiment of the durable transponder configuration described in relation to FIGS. 11, 12 and 13, the durable transponder and destructible transponder may be fabricated using two different electrical conductor technologies. For instance, the durable transponder may be fabricated using etched metal (e.g., copper or aluminum) electrical conductors, and the destructible transponder could be conducted using any of the conductor technologies described herein.

The Use of Different Transponder Frequencies and Protocols

In a preferred embodiment of the dual transponder configuration described in relation to FIGS. 11,12 and 13, the durable transponder and destructible transponder may operate at different frequencies or use different RFID protocols, or both. Operating the two transponders at different frequencies offers several potential advantages. As discussed above, when two transponders operating at the same frequency are placed in close proximity, the two antenna coils or induction loops have a de-tuning effect on each other which can result in the read distance for each transponder being reduced from the normal operating range. The magnitude of this effect will depend on the operating frequency, antenna geometry and position of one transponder relative to the other. For instance, when two similar transponders are placed directly on top of each other, the read distance for each may be substantially reduced. Two transponders operating at two different frequencies usually have a lesser de-tuning effect on each other than two transponders operating at the same frequency. For instance, it can be demonstrated that placing a 2.45 GHz transponder in the center of a 13.56 MHz transponder coil will have minimal effect on the performance of either transponder.

Another potential benefit of using different frequencies for the two transponders is reduced label size. For instance, even when placed adjacent to each other (rather than on top of each other or one within the other), a combination of a 2.45 GHz transponder and a 13.56 MHz transponder will be smaller than two adjacent 13.56 MHz transponders, simply due to the smaller size of the 2.45 GHz transponder.

The use of two different RFID chip types (with different RFID protocols) in the dual transponder construction may also provide certain benefits. In one preferred embodiment, one chip could be an industry standard chip while the other could be a custom chip, said custom chip incorporating enhanced features, functionally or security and being visible (in an RFID sense) only to especially configured RFID readers. In this case the dual transponder construction would "look" like a standard single transponder construction to a standard RFID reader.

The embodiments illustrated and discussed in this specification are intended only to teach those skilled in the art the best way known to the inventors to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described.

Composition of the Adhesion Modifying Coating

The adhesion modifying layer 1001 is comprised of an adhesion modifying material applied according to the previously described methodologies. The formulation of the said material affects the relative adhesion strengths between the different layers and therefore affects the performance of the tamper indicating RFID label.

A typical formulation of said adhesion modifying coating is as follows.

| Component | Weight % Range | Weight % Preferred |
|---|---|---|
| Polymer resin or oligomer | 5–97 | 15–65 |
| Diluent | 0–80 | 25–80 |
| Catalyst | 0–10 | 0–7 |
| Filler | 0–30 | 0–20 |
| Colorant | 0–1.0 | 0.1–1.0 |
| Flow control additive | 0.0–2.0 | 0.05–1.5 |
| Defoamer | 0.01–1.0 | 0.05–0.5 |

It should be noted that not all of the above components are necessarily present in every formulation.

In the above formulation, numerous chemicals may be utilized for each component. They are selected based on their adhesion modifying properties for the selected substrate. Examples of substrate films that can be used are polyester, polyimide, polyetherimide, polyurethane, vinyl and paper. Polyethylene terephtalate (PET) films in varying thickness are preferred. Different types of resins will have varying levels of adhesion on a particular substrate. This can be exploited to adjust the adhesion to the desired level by using blends of polymer resins or co-polymers whose component parts possess different adhesion characteristics. For example, the polymer resin can be a thermoplastic resin such as a phenoxy resin (for example, Paphen® PKHC manufactured by Phenoxy Specialties). Other possible resins include thermoplastic acrylic, vinyl, polystyrene co-polymers and polyurethane resins. Thermally cured thermosetting resin compositions may also be employed. For example, isocyanate or amino resin crosslinked epoxy, phenoxy, polyester and vinyl resins, anhydride or amine crosslinked epoxy resins.

In addition to the above, radiation cured formulations (ultraviolet/visible light or electron beam) can be used, such as free radical initiated acrylate or methacrylate systems based on acrylated or methacrylated oligomers. For example, acrylated or methacrylated epoxy, urethane and polyester oligomers or cationic initiated systems based on vinyl ethers, epoxies, cycloaliphatic epoxies, epoxidized oils and rubbers may be used.

The diluent, which is selected based on compatibility with the chosen resin, the viscosity of the solution, speed of drying and ease of printing, can be water and/or an organic solvent. For example, glycol ethers or glycol ether acetates such as di(ethylene glycol) butyl ether (butyl carbitol) and di(ethylene glycol) ethyl ether acetate (carbitol acetate), dibasic esters such as dimethyl adipate, dimethyl succinate or dimethyl glutarate, gamma butyrolactone, n-methyl pyrrolidinone, aromatics such as toluene and xylene, ketones such as methyl ethyl ketone and isophorone or mixtures thereof, may be used. In the thermosetting and cationic formulations, the diluent may include reactive diluents in addition to or in place of the water or organic solvent, such as low viscosity glycols (for example, diethylene, triethylene, dipropylene or tripropylene glycol), polyglycols (for example, polyethylene, polytetramethylene or polypropylene glycol) and polyester polyols (for example, Tone® polyols available from Union Carbide). In the case of free radical initiated formulations low viscosity acrylate or meth- acrylate monomers are used. In some instances when using a low viscosity resin or oligomer the diluent may be omitted entirely.

The thermosetting and radiation cured formulas also employ a catalyst. In the amino resin cross linked formulas the catalyst can be a blocked organic or inorganic acid, such as Nacure® 2530 manufactured by King Industries.

Epoxy formulations employ catalysts or hardeners such as anhydrides (for example, Methylhexahydrophthaliic anhydride), tertiary amine or imidazole catalysts (for example, Imicure® AMI-2 manufactured by Air Products and Chemicals), dicyandiamide and amine, amidoamine or modified amine hardeners (for example, ANCAMINE® 2337S manufactured by Air Products and Chemicals).

The Ultraviolet/visible light formulas are cured using free radical or cationic photoinitiators, such as Irgacure® 184 manufactured by Ciba specialty chemicals or Cyracure® UVI 6992 manufactured by Union Carbide. Electron beam cured formulasdo not require a catalyst.

Fillers are used alone or in combination to control the viscosity and rheology of the coating for ease of application. Inert fillers such as talc, silica, kaolin, calcium carbonate or barium sulfate may be added. Thixotropic fillers such as synthetic silica can also be used (for example, Aerosil® R-202 manufactured by Degussa).

Flow control additives typically include materials such as surfactants and leveling agents. These ingredients contribute to the wetting of the substrate and the quality of the coating surface.

Typical Flow control additives are modified silicone oils such as BYK Chemie's BYK® 323 or non-silicone leveling agents such as Modaflow® manufactured by Solutia. Typical surfactants are fluorocarbons such as FC430 manufactured by 3M or silicone materials such as BYK® 307. In some cases, one ingredient (e.g., a surfactant) may provide several of the effects attributed to the leveling agent, surfactant. In addition, one or more of the major ingredients (e.g., diluent or polymer) might provide the performance attribute normally provided by these minor ingredients.

Defoamers are chemicals added to control the formation of foam during mixing and application of the coating. A typical defoamer is BYK® 075. In some cases silicone or non silicone leveling agents may provide the performance attributes of a defoamer or air release agent.

Optionally, colorants such as dyes (e.g organic dyes), inorganic, organic or organometallic pigments or mixtures, solutions or dispersions thereof may also be added. For example, Polytrend® colorant dispersions manufactured by Creanova.

The following examples are presented to illustrate, not limit the invention.

EXAMPLE 1

Manufacture of the Coating

A coating was prepared using the following ingredients.

TABLE 2

| Component | Approx. Weight % |
|---|---|
| Resin | 25.4 |
| Phenoxy Resin (Paphen ® PKHC) | |
| Diluent | 74.1 |
| (Di(ethylene glycol) ethyl ether acetate) | |

TABLE 2-continued

| Component | Approx. Weight % |
|---|---|
| Defoamer (BYK® 075) | 0.1 |
| Colorant (Phthalocyanine Blue 12% dispersion) Polytrend® 850-7240 | 0.4 |

The phenoxy resin is dissolved in the solvent with stirring and heating to 50–60° C. The mixture is cooled to 25° C. and the defoamer and colorant added. The solution is further mixed to combine the ingredients.

EXAMPLE 2

Application of the Coating

The coating of example 1 was applied to 0.05 mm thick untreated polyethylene terephtalate film through a patterned 300 mesh stainless steel screen using standard screen printing technology.

The screen mesh was selected to produce a dry ink film thickness (DIFT) of between 3 and 7 microns, 4–5 microns being the typical DIFT. Stainless steel or polymer mesh screens are acceptable. The applied coating was cured in a conveyor oven at 120° C. for 60 seconds.

Alternatively, in the case of a radiation cured formula a subtractive technique can be used. These formulas are commonly referred to as photo imagable wherein the coating is applied as a solid continuous layer. This layer is then exposed to the radiation through a mask or phototool containing the desired pattern. The areas of the coating where the radiation is not blocked by the mask are cured and remain intact. The areas of the coating where the radiation is blocked remain uncured and are subsequently removed by a developer. Developers are typically organic solvents, water or aqueous solutions of an inorganic base (for example, Sodium Carbonate).

It should be apparent to one having ordinary skill in the art that variations are possible without departing from the spirit and scope of the invention.

Methods to Manufacture of Tamper Indicating RFID Label

A preferred method of manufacture of a preferred embodiment of the invention are illustrated by way of a non-limiting example using the construction of tamper indicating label 900 as depicted in FIGS. 10A, 10B, 10C, and 10D. It is appreciated that the methods described herein are typical approaches and other methods familiar to those practiced in the art may also be employed.

Each layer of the transponder design is step and repeated to create a multi-up layout on large area, such as 18 by 24 inches, in order to economically manufacture multiple pieces on each sheet of material processed. It is appreciated that multiple pieces will be processed for each step described below. It is also appreciated that typical manufacturing practices will process multiple sheets sequentially at each process step.

The substrate layer 901 is comprised of Polyethylene terephtalate (PET) film. The PET film is heat stabilized to relieve mechanical stresses and reduce dimension instability as a function of temperature exposure. The holes for the through connects 904 are then formed by laser, drilling or punching.

The antenna layer 903 is applied to the top surface of the substrate 901 by screen printing a conductive polymer thick film ink (e.g. silver filled ink). The polymer thick film ink is then thermally cured.

A layer of insulting dielectric is then screen printed over the antenna layer 903 and UV cured to form the insulating cross-over layer. A second layer may be applied in a similar fashion. A layer of conductive polymer thick film ink (e.g., silver filled ink) is screen printed on top of the insulating cross-over layer to form the conductive portion of the cross-over, and then thermally cured. The filling of the through connect holes 904 may be accomplished at the same process step or by an addition printing and curing step. The cross-over layer is consider to be a part of antenna layer 903.

The adhesion modifying layer 1001 is then applied to the bottom surface of substrate 901 by screen printing and thermally curing the adhesion modifying material. The tamper track 905 is then formed by screen printing and thermally curing a conductive polymer thick film ink (e.g., silver filled ink).

The RFID memory device (usually referred to as an RFID "chip") 902 is applied to the top surface of the substrate 901 by applying an anisotropic conductive adhesive paste to the chip location, placing the chip into said paste, and curing said paste via thermal compression bonding to form both a mechanical and electrical connection between the chip 902, substrate 901 and antenna 903.

The assembled construction may be tested for functionality, after which the sheet is cut into strips which are then spliced together to form a roll of transponders. The adhesive layer 906 and release liner layer 1002 are then applied to the bottom of the substrate 901, adhesion modifying layer 1001 and tamper track layer 905. The top layer is then applied to the top of the substrate 901, over the chip 902 and antenna 903.

It is appreciated that alternative approaches may be employed at each of the aforementioned process steps and that entirely different process flow charts and materials may be employed to obtain a similar end product.

It is also appreciated that a tamper indicating transponder label can be created using an active or passive RF device. Furthermore, it is appreciated that the materials, methods and constructions described herein may be utilized to create tamper indicating circuitry containing non-RF devices or no discrete electronic devices at all.

What is claimed is:

1. A flexible tamper indicating transponder comprising a flexible transponder and an adhesion modifying coating having a composition comprising 5–97% polymer, 0–80% solvents, and 0.01–1.0% defoamer.

2. The flexible tamper indicating transponder of claim 1 comprising (a) a flexible substrate, (b) conductive tracks adhered to one or both surfaces of said flexible substrate, (c) an integrated circuit affixed to at least one surface of said flexible substrate, and (d) the adhesion modifying coating applied to one or both surfaces of said flexible substrate.

3. The flexible tamper indicating transponder of claim 2 wherein said substrate is selected from the group consisting of polyester, polyurethane, polyimide, polyetherimide, vinyl, nylon and paper.

4. The flexible tamper indicating transponder of claim 2 wherein said conductive tracks are polymer thick film inks, solid metal conductors, and transfer-laminated conductors.

5. The flexible tamper indicating transponder of claim 4 wherein said solid metal conductors are selected from the group consisting of silver, copper, and aluminum.

6. The flexible tamper indicating transponder of claim 4 wherein said polymer thick film inks are conductive inks consisting of conductive particles in a polymer binder said conductive particles selected from the group consisting of silver, copper, gold, carbon and graphite.

7. The flexible tamper indicating transponder of claim 4 wherein said transfer laminated conductors are inks consisting of conductive particles selected from the group consisting of silver and copper with and without a polymer binder.

8. The flexible tamper indicating transponder of claim 3 wherein said substrate is polyethylene terephthalate film.

9. The flexible tamper indicating transponder of claim 2 wherein said tamper track is a transfer laminated conductor attached to the substrate with a bonding adhesive, with no adhesion modifying coating present.

10. The flexible tamper indicating transponder of claim 9 wherein said bonding adhesive is patterned or solid.

11. The flexible tamper indicating transponder of claim 10 wherein an adhesion modifying coating is applied over or under the said tamper tracks.

12. The flexible tamper indicating transponder of claim 2, wherein said adhesion modifying coating is applied directly to said substrate.

13. The flexible tamper indicating transponder of claim 2, wherein said conductive tracks comprise tamper indicating tracks and an antenna coil.

14. The flexible tamper indicating transponder of claim 2, wherein said tamper indicating tracks are applied in contact with said adhesion modifying coating.

15. The flexible tamper indicating transponder of claim 2, wherein the said adhesion modifying coating is applied directly to the substrate; the said conductive tacks comprise tamper indicating tracks and the antenna coil; the tamper indicating tracks are applied in contact with said adhesion modifying coating.

16. The tamper indicating transponder of claim 15 wherein the said tamper indicating tracks comprise a portion or the entirety of said antenna coil.

17. The tamper indicating transponder of claim 15 wherein said tamper tracks are independent from said antenna coil.

18. The tamper indicating transponder of claim 15 wherein said antenna and integrated circuit are on the same side or the substrate as the said adhesion modifying coating and tamper indicating tracks.

19. The tamper indicating transponder of claim 15 wherein said antenna and integrated circuit are on the opposite side of the substrate as the said adhesion modifying coating and tamper indicating tracks.

20. The tamper indicating transponder of claim 15 wherein an adhesive is affixed to the said transponder in contact with the said tamper indicating tracks.

21. The tamper indicating transponder of claim 20 wherein the relative adhesion between the said adhesive, tamper indicating tracks, adhesion modifying layer and substrate is controlled by the pattern of the adhesion modifying layer.

22. The tamper indicating transponder of claim 21 wherein the said pattern of the said adhesion modifying layer contains one or more of the following features:
   a solid coating pattern,
   a pattern of regions with and without said adhesion modifying material,
   a solid, contiguous border at the perimeter of said transponder,
   a non-contiguous border at the perimeter of said transponder.

23. The tamper indicating transponder of claim 22 wherein the said pattern of the said adhesion modifying layer is further comprised of one or more of the following features:
   a grid pattern comprised of lines and gaps between them,
   a grid pattern comprised of geometric shapes and gaps between them,
   said grid pattern is orthogonal or angled relative to the transponder perimeter,
   a variation in the density of said grid pattern achieved by varying the size of the lines, geometric shapes and/or the gaps between them,
   larger geometric shapes in the said grid pattern wherein no adhesion modifying coating is applied.

24. The tamper indicating transponder of claim 23 wherein the said pattern of the said adhesion modifying layer is further comprised of the following features:
   a grid pattern comprised of lines and gaps,
   said grid pattern is applied at an angle relative to the said transponder perimeter,
   a contiguous border at said transponder perimeter
   one or more regions absent: of said adhesion modifying coating,
   region absent of said adhesion: modifying coating position in alignment with one or more electronic devices, such as the REID integrated circuit.

25. A method for applying an adhesion modifying coating in a predetermined pattern on a tamper indicating transponder comprising an additive printing process.

26. The method of claim 25 wherein said additive printing process is selected from the group consisting of screen printing, roto-gravure and lithography.

27. A method for applying an adhesion modifying coating in a predetermined pattern on a tamper indicating transponder comprising a subtractive printing process.

28. The method of claim 27 wherein said subtractive printing process comprises (1) applying a uniform coating of said adhesion modifying coating on a surface of said transponder, (2) applying a mask with the image of the desired pattern of said coating, (3) curing said coating, and (4) removing the unwanted coating.

29. An electrically conductive ink for use in a tamper indicating transponder of claim 14, said ink selected from the group consisting of polymer thick film inks, inks with or without adhesive, inks comprising conductive particles, and transfer laminated inks.

30. The electrically conductive ink of claim 29 wherein said conductive particles are selected from the group consisting of silver, copper, gold, carbon and graphite.

31. An adhesion modifying coating for a tamper indicating transponder, said coating affecting the destruction of an electrically conducting material in said transponder, wherein said coating is applied before the application of said electrically conducting material.

32. An adhesion modifying coating for a tamper indicating transponder, said coating affecting the destruction of an electrically conducting material in said transponder, wherein said coating is applied after the application of said electrically conducting material.

33. The adhesion modifying coating of claim 31, wherein said coating comprises varnish, silicone, or ink.

34. The adhesion modifying coating of claim 32, wherein said coating comprises varnish, silicone, or ink.

35. A method of applying an adhesion modifying coating to a tamper indicating transponder used as a label component, so that said transponder will indicate whether an attempt has been made to tamper with said label, said method comprising applying said coating as a pattern of straight or curved lines, circles, dots, or other geometric shapes, said patterns optionally being interconnected.

36. The method of applying the adhesion modifying coating of claim 35 wherein said pattern is selected from the group consisting of a straight line square grid, a pattern oriented at different angles relative to the pattern of electrically conducting material, and a pattern having varying line widths and spaces between lines.

37. The method of applying said adhesion modifying coating of claim 28, wherein said coating is cured via thermal curing, curing by Ultraviolet or visible light and electron radiation.

38. A method for modifying the destructibility properties of destructible tamper indicating tracks used in a tamper indicating transponder label, wherein said modification involves changing the formulation of an adhesive modifying coating material.

39. The flexible tamper indicating transponder of claim 3 wherein only a single layer of one substrate is used.

40. The flexible tamper indicating transponder of claim 3 wherein multiple layers of substrate are used.

41. The flexible tamper indicating transponder of claim 40 wherein said multiple layers are made of the same substrate.

42. The flexible tamper indicating transponder of claim 40 wherein said multiple layers are made of different substrates.

43. The flexible tamper indicating transponder of claim 4, wherein two or more transponders are incorporated onto a single substrate.

44. The flexible tamper indicating transponder of claim 43, wherein said transponders operate at two or more frequencies or protocols.

45. The tamper indicating transponder of claim 2 wherein the integrated circuit may be active or passive.

46. The tamper indicating transponder of claim 45 comprising one or more electronic components in addition to said integrated circuit.

47. The flexible tamper indicating transponder of claim 1 comprising (a) flexible substrate, (b) conductive tracks adhered to one or both surfaces of said flexible substrate, and (c) the adhesion modifying coating applied to one or both surfaces of said flexible substrate.

48. The tamper indicating circuit construction of claim 47 comprising one or more electronic components attached to said conductive tracks.

* * * * *

UNITED STATES PATENT AND TRADEMARK OFFICE
CERTIFICATE OF CORRECTION

| | | |
|---|---|---|
| PATENT NO. | : 7,049,962 B2 | Page 1 of 1 |
| APPLICATION NO. | : 09/915760 | |
| DATED | : May 23, 2006 | |
| INVENTOR(S) | : Peter S. Atherton et al. | |

It is certified that error appears in the above-identified patent and that said Letters Patent is hereby corrected as shown below:

Title page, Item (73) Assignee "Micoh Corporation" should read --Mikoh Corporation--;

Column 2, line 35, "REID" should read --RFID--;

Column 2, line 44, "RFTD" should read --RFID--;

Column 11, line 45, "REID" should read --RFID--;

Column 11, line 49, "REID" should read --RFID--;

Column 13, line 18, "tack" should read --track--;

Column 16, line 48, "REID" should read --RFID--;

Column 20, line 19, "formulasdo" should read --formulas do--;

Column 23, claim 15, line 32, "tacks" should read --tracks--;

Column 23, claim 18, line 44, "or" should read --of--;

Column 24, claim 24, line 26, "REID" should read --RFID--; and

Column 24, claim 29, line 43, "14" should read --4--.

Signed and Sealed this

Twenty-seventh Day of November, 2007

JON W. DUDAS
*Director of the United States Patent and Trademark Office*